US012621843B2

(12) United States Patent
Guo et al.

(10) Patent No.: US 12,621,843 B2
(45) Date of Patent: May 5, 2026

(54) METHODS, APPARATUS AND SYSTEMS FOR MONITORING A CONTROL CHANNEL

(71) Applicant: ZTE CORPORATION, Shenzhen (CN)

(72) Inventors: Qiujin Guo, Shenzhen (CN); Mengzhu Chen, Shenzhen (CN); Jun Xu, Shenzhen (CN); Xuan Ma, Shenzhen (CN); Xiaoying Ma, Shenzhen (CN); Focai Peng, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 253 days.

(21) Appl. No.: 18/218,795

(22) Filed: Jul. 6, 2023

(65) Prior Publication Data

US 2023/0354364 A1 Nov. 2, 2023

Related U.S. Application Data

(63) Continuation of application No. PCT/CN2021/083592, filed on Mar. 29, 2021.

(51) Int. Cl.
*H04W 72/232* (2023.01)
*H04W 72/51* (2023.01)

(52) U.S. Cl.
CPC ......... *H04W 72/232* (2023.01); *H04W 72/51* (2023.01)

(58) Field of Classification Search
CPC ....... H04W 72/23; H04W 8/24; H04W 24/10; H04W 72/0446; H04W 76/27;
(Continued)

(56) References Cited

U.S. PATENT DOCUMENTS

2020/0045700 A1    2/2020   Sun et al.
2021/0250153 A1*   8/2021   Lin ....................... H04W 72/23
(Continued)

FOREIGN PATENT DOCUMENTS

CN    110719645 A    1/2020
EP    3 793 154 A1    3/2021
(Continued)

OTHER PUBLICATIONS (Moderator) Lenovo, "Draft TP on search space set group switching" 3GPP TSG RAN WG1#100bis-e, R1-2003042, Apr. 30, 2020, e-Meeting (3 pages).
(Continued)

*Primary Examiner* — Khalid W Shaheed
(74) *Attorney, Agent, or Firm* — Foley & Lardner LLP

(57) ABSTRACT

Systems, methods and devices for control channel monitoring may include a wireless communication device reporting, to a wireless communication node, a plurality of capabilities of the wireless communication device. The wireless communication device may receive, from the wireless communication node, control information. The wireless communication device perform physical downlink control channel (PDCCH) monitoring using a group of search space sets (SSSs) selected from a plurality of search space set groups (SSSGs) or PDCCH skipping using a skipping duration according to the control information. The number of SSSG can be an integer N that is not smaller than 1, or each of the SSSGs can include a number of SSSs that is at least zero and at most equal to a maximum number of SSSs configured in a bandwidth part (BWP). The number of skipping duration values can be an integer M greater than or equal to 0.

19 Claims, 16 Drawing Sheets

(58) Field of Classification Search
CPC ....... H04W 72/51; H04W 8/22; H04W 76/10;
H04W 72/04; H04W 88/02; H04W
72/232; H04W 48/12
See application file for complete search history.

(56) References Cited

U.S. PATENT DOCUMENTS

| | | | | |
|---|---|---|---|---|
| 2022/0150946 | A1* | 5/2022 | Tsai | H04W 76/28 |
| 2022/0322375 | A1* | 10/2022 | Huang | H04W 72/044 |
| 2023/0011965 | A1* | 1/2023 | Ma | H04W 52/0229 |
| 2024/0205738 | A1* | 6/2024 | Shilov | H04W 4/70 |

FOREIGN PATENT DOCUMENTS

| | | | |
|---|---|---|---|
| EP | 3 796 702 A1 | 3/2021 | |
| WO | WO-2020/033884 A1 | 2/2020 | |

OTHER PUBLICATIONS

International Search Report and Written Opinion for PCT Appl. No.
PCT/CN2021/083592, mailed Jan. 4, 2022 (9 pages).
First Office Action for CN Appl. No. 202180095628.2, dated May
18, 2024 (with English translation, 12 pages).

* cited by examiner

300 ⟍

310 ⟍

400 time skipping duration

410 time

SS group 1

SS group 0

500

510

520

600

| Report/Receive a plurality of capabilities of a wireless communication device | 602 |
|---|---|

| Receive/Send control information | 604 |
|---|---|

| Perform PDDCH monitoring using a group of SSSs selected from a plurality of SSSGs or PDCCH skipping using a skipping duration selected from a list of candidate skipping duration values according to the control information | 606 |
|---|---|

1100

'01'

'00'

SSSG0

SSSG1

'01'

'00'

1110

'10'

'11'

1st skipping duration value

PDCCH monitoring according to SSS

2nd skipping duration value expires expires

METHODS, APPARATUS AND SYSTEMS FOR MONITORING A CONTROL CHANNEL

CROSS-REFERENCE TO RELATED APPLICATION

This application claims the benefit of priority under 35 U.S.C. § 120 as a continuation of International Patent Application No. PCT/CN2021/083592, filed on Mar. 29, 2021, the disclosure of which is incorporated herein by reference in its entirety.

TECHNICAL FIELD

The disclosure relates generally to wireless communications, including but not limited to methods, devices and systems for control channel monitoring.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based, and some being hardware based, so that they could be adapted according to need.

SUMMARY

At least one aspect is directed to a system, method, apparatus, or a computer-readable medium. A wireless communication device may report, to a wireless communication node, a plurality of capabilities of the wireless communication device. The wireless communication device may receive, from the wireless communication node, control information. The wireless communication device perform physical downlink control channel (PDCCH) monitoring using a group of search space sets (SSSs) selected from a plurality of search space set groups (SSSGs) according to the control information. The number of SSSG can be N, where N is an integer that is not smaller than 1, or each of the SSSGs can includes a number of SSSs that is at least zero and at most equal to a maximum number of SSSs configured in a bandwidth part (BWP).

In some embodiments, the plurality of SSSGs, configured in the BWP, can includes a power saving (PS) SSSG. At least one of the following applies: (i) the PS SSSG may not configured with a search space set by higher layer signaling, or a number of search space set in the PS SSSG is zero, (ii) the PS SSSG can be a SSSG configured with restrictions for at least one PDCCH monitoring parameter of any search space set in the PS SSSG, where the restrictions can include at least one of (a) a bitmap of monitoring symbols within a slot is all zeros, (b) a duration (Ts) is 0 slot, (c) a PDCCH monitoring periodicity (ks) is NULL, (d) the ks is invalid, (d) a PDCCH monitoring offset (Os) is equal to (ks−1) slots, (e) a start position of the PS SSSG is a next adjacent slot, or (f) a number of PDCCH monitoring occasions is equal to 0, or (iii) the PS SSSG can be associated with a power saving (PS) timer, and the wireless communication device does not monitor PDCCH in type-3 common search space (CSS) sets or user equipment specific search space (USS) sets during running of the PS timer.

The plurality of SSSGs, configured in the BWP, can include at least one of (i) a normal SSSG that includes at least one search space set of a type comprising of type-3 common search space (CSS) or user equipment specific search space (USS), or (ii) a regular SSSG that includes all search space sets configured in a downlink (DL) BWP in a cell or across a group of cells bundled for SSSG switching or PDCCH skipping. A switching timer can be associated with the normal SSSG or the regular SSSG, and the switching timer can be set as a value configured by a higher layer parameter when the wireless communication device starts monitoring PDCCH according to the normal SSSG or the regular SSSG, or as a value configured by a higher layer parameter when the wireless communication device is monitoring PDCCH according to the normal SSSG or the regular SSSG, and detects any PDCCH, or a PDCCH with scheduling downlink control information (DCI), or a PDCCH with a SSSG switching indication.

The SSSGs can be classified according to at least one of the following parameters:

radio network temporary identifier (RNTI) types including at least one of: cell RNTI (C-RNTI), cancellation Indication RNTI (CI-RNTI), configured scheduling RNTI (CS-RNTI), interruption RNTI (INT-RNTI), slot format indication RNTI (SFI-RNTI), semi-persistent channel state information RNTI (SP-CSI-RNTI), transmit power control (TPC) physical uplink control channel RNTI (TPC-PUCCH-RNTI), TPC physical uplink shared channel RNTI (TPC-PUSCH-RNTI), TPC sounding reference signal RNTI (TPC-SRS-RNTI), and availability indication RNTI (AI-RNTI), a number of SSSs associated with the SSSGs, the number of SSSs including at least one value of: 0, 1, 2, 3, 4, 5, 6, 7, 8, 9, or 10, SSS identifier (ID) including at least one integer value that is greater than or equal to 1, and smaller than or equal to 39, search space type including at least one of: type-3 CSS type or USS type, control resource set (CORESET) ID associated with a group of one or more SSSs including at least one value of: 0, 1, 2, 3, 4 or 5, density or number of PDCCH monitoring occasions during a period including at least one of: monitoring zero slot per slot, monitoring one slot per ks slots, monitoring K slots per ks slots, or monitoring one slot per slot, where ks is a PDCCH monitoring periodicity, and K is a positive integer value that is greater than or equal to 2, and less than or equal to (ks−1), or the ks, or offset Os, or duration Ts for at least one search space set in one of the SSSGs.

In some embodiments, the wireless communication device can perform PDCCH skipping according to a skipping duration, responsive to at least one triggering event associated with the control information. The skipping duration value can be determined among M PDCCH skipping duration values that are in a list of candidate skipping duration values configured via higher layer signaling, and M is an integer greater than or equal to 1.

The list of candidate skipping duration values can include a subset of values of PDCCH monitoring periodicity (ks) in SearchSpace information element (IE), or a subset of values of discontinuous reception (DRX) inactivity timer, or a subset of values of DRX onDuration timer. The skipping duration value can be configured by radio resource control (RRC) signaling and selected from the list of candidate skipping duration values configured via higher layer signaling. A difference between each pair of adjacent candidate skipping duration values can be at least 1 millisecond. The skipping duration can be decremented by one after each slot according to a reference subcarrier spacing (SCS) configuration. The reference SCS configuration can be a smallest SCS configuration among all configured downlink (DL) bandwidth parts (BWPs) in a serving cell, or in a set of serving cells. The reference SCS configuration can be maintained during the running of the skipping duration.

In some embodiments, SSSG switching between the SSSGs or the PDCCH skipping, can be triggered via an indication in downlink control information (DCI). A bit-width of an indication field of the DCI is denoted W, where W is an integer greater than or equal to 1 and is determined according to functions related to the SSSG switching or the PDCCH skipping, or according to a value of a number of SSSGs (N) or a number of PDCCH skipping duration values (M) indicated via higher layer signaling.

A leading bit or most significant bit (MSB) of a field for indicating the SSSG switching or the PDCCH skipping can be used to indicate at least one of (i) to enable or disable the PDCCH monitoring according to a SSSG, or the SSSG switching, (ii) to enable or disable the PDCCH monitoring according to a SSSG configured with restrictions, (iii) to enable or disable the PDCCH skipping according to a skipping duration, or (iv) to enable or disable the PDCCH monitoring according to all SSSs configured in an active downlink (DL) BWP in a cell or across a group of cells bundled for SSSG switching or PDCCH skipping. One or more remaining bits or non-MSB of the field for indicating the SSSG switching or the PDCCH skipping, can be used to indicate at least one of (a) an SSSG identifier (ID) of a SSSG to which the wireless communication device shall switch, to perform the PDCCH monitoring, wherein the SSSG ID is determined according to a current monitored SSSG or a value of a bit field indicating that the wireless communication device shall perform the SSSG switching to monitor PDCCH, (b) a value of a skipping duration, (c) a regular SSSG in a cell or across a group of cells bundled for the SSSG switching or the PDCCH skipping, or (d) the SSSG configured with restrictions.

The wireless communication device can perform the PDCCH monitoring to switch to a default SSSG after a plurality of triggering events or expiration of the PS SSSG. The plurality of triggering events can be related to data processing and can be detected by the wireless communication device. The plurality of triggering events can include at least one of PDCCH decoding, running of a DRX-RetransmissionTimer DL/UL timer, a scheduling request (SR) transmission on a physical uplink control channel (PUCCH) with a pending state, receiving a random access response (RAR) or PDCCH decoding with a cyclic redundancy check (CRC) scrambled by a random access radio network temporary identifier (RA-RNTI) for a random access preamble that is not selected by a medium access control (MAC) entity among contention-based random access preambles, start of an Active Time activated by events except for running of drx-onDurationTimer or drx-InactivityTimer, or the wireless communication device monitors a search space set provided by recoverySearchSpaceId. The expiration can include at least one of the PS timer is decremented to 0 or the PS timer expires, or a duration to determine a valid time of the PS SSSG ends.

The wireless communication device can switch from PDCCH skipping to PDCCH monitoring using a default SSSG after an end of the skipping duration.

SSSG switching to another SSSG, or switching from or to PDCCH skipping, can be triggered without any indication in downlink control information (DCI). The wireless communication device can perform at least one of (i) switching from the normal SSSG or the regular SSSG to the PS SSSG or to the PDCCH skipping, after a switching timer expires, (ii) switching from the regular SSSG to the normal SSSG, after the switching timer expires, (iii) switching from a denser normal SSSG to a sparser normal SSSG, after the switching timer expires, wherein the denser normal SSSG includes more SSSs, or more radio network temporary identifier (RNTI) types, or more PDCCH monitoring occasions, or a larger Ts value, or a smaller ks value, as compared with that of the sparser normal SSSG, or (iv) switching from the PS SSSG or from PDCCH skipping to a default SSSG, when a plurality of triggering events related to data processing are detected by the wireless communication device. The default SSSG can be configured by radio resource control (RRC) signaling or pre-determined among at least one of at least one normal SSSG or at least one regular SSSG.

SSSG switching between the SSSGs can consist of switching between SSSs belonging to at least one of type-3 common search space (CSS) sets and UE-specific search space (USS) sets. All SSSs in the regular SSSG can include all SSSs belonging to type-3 CSS sets and USS sets, and are configured in the DL BWP. A minimum delay for switching among the SSSGs, or switching to or from PDCCH skipping, can be 25 symbols for a subcarrier spacing configuration numerology of =0/1/2 for capability 1 or 10/12/22 symbols for μ=0/1/2 for capability 2. The minimum delay for μ=3 may not be larger than 36 symbols and the minimum delay for μ=3 for capability 1 may not be less than that for capability 2, or the minimum delay for μ=3 for both capability 1 and capability 2 may be 25 symbols.

When the wireless communication device switches to a sparser SSSG or to PDCCH skipping, there can be a specific duration before the wireless communication device is to start PDCCH monitoring according to the sparser SSSG or the PDCCH skipping, triggered by at least one of (i) the wireless communication device detecting an initial transmission of PDCCH scheduling, (ii) expiration of a switching timer, or (iii) an indication DCI triggering the wireless communication device to switch to the sparser SSSG or the PDCCH skipping. During the specific duration, the wireless communication device can continue PDCCH monitoring according to the current SSSG.

The specific duration can be triggered or can start after a slot in which the wireless communication device receives an indication in downlink control information (DCI) or in which a switching timer expires, and can end after a slot upon which all downlink scheduled data are received successfully. The specific duration can be triggered or can start after a slot in which the wireless communication device receives the indication in the DCI or in which the switching timer expires, and can end after a slot upon which a most recent scheduled data is completely received by using a maximum number of retransmission. The specific duration can be configured by radio resource control (RRC) signaling. The specific duration can be determined by bandwidth part (BWP) switching delay. The specific duration can end after an earliest slot between the slot upon which the most recent scheduled data is completely received by using the maximum number of retransmission and the slot upon which all scheduled downlink data are received successfully. All scheduled data are received successfully can include all physical downlink shared channel (PDSCH) hybrid automatic repeat request (HARQ) processing are completed in a serving cell or across related component carriers (CCs) bundled for SSSG switching or the PDCCH skipping, or all PDSCH and PUSCH processing are completed in the serving cell or across the related CCs bundled for the SSSG switching or the PDCCH skipping.

The wireless communication device can initiate PDCCH monitoring according to a default SSSG during a duration that a drx-RetransmissionTimerDL/UL is running, when discontinuous reception (DRX) is configured and the wireless communication device is performing the PDCCH monitoring according to the sparser SSSG or the PDCCH skipping. The wireless communication device can stop PDCCH monitoring according to the PDCCH skipping or the sparser SSSG, when discontinuous reception (DRX) is configured or the wireless communication device is performing the PDCCH monitoring according to the PDCCH skipping or the sparser SSSG. The wireless communication device can initiate PDCCH monitoring according to a default SSSG after the wireless communication device transmits a scheduling request (SR) on a physical uplink control channel (PUCCH) and the SR is pending, or after the wireless communication device receives a random access response (RAR) successfully for a random access preamble that is not selected by a medium access control (MAC) entity among contention-based random access preambles, or after an Active Time is activated by events except for running of drx-onDurationTimer or drx-InactivityTimer, or after the wireless communication device monitors a search space set provided by recoverySearchSpaceId.

The wireless communication device can stop PDCCH monitoring according to the PDCCH skipping or the sparser SSSG, when discontinuous reception (DRX) is configured or the wireless communication device is performing the PDCCH monitoring according to the PDCCH skipping or the sparser SSSG. The wireless communication device can initiate PDCCH monitoring according to the default SSSG at a first slot that is at least a defined number of symbols after a last symbol of a scheduling request (SR) on a physical uplink control channel (PUCCH) and the SR is pending, or after a last symbol of a random access response (RAR) or a PDCCH decoded with a cyclic redundancy check (CRC) scrambled by a random access radio network temporary identifier (RA-RNTI) for a random access preamble that is not selected by a medium access control (MAC) entity among contention-based random access preambles, or after an Active Time is activated by events except for running of drx-onDurationTimer or drx-InactivityTimer.

In some embodiments, the sparser SSSG can include a group of SSSs each with fewer PDCCH monitoring occasions or fewer number of search space sets than other SSSs, or the default SSSG can be configured by a radio resource control (RRC) signaling parameter or predefined among at least one of one or more normal SSSGs or one or more regular SSSGs, or whether the wireless communication device shall switch to a default SSSG can be configured by a radio resource control (RRC) signaling parameter.

The plurality of capabilities of the wireless communication device can include at least one of:
  searchSpaceSetGroupSwitchingwithDCI-r17, which indicates whether the wireless communication device supports switching among a plurality of groups of SSSs with DCI 0_1 or DCI 1_1 or DCI 0_2 or DCI 1_2 monitoring;

searchSpaceSetGroupSwitchingwithoutDCI-r17, which indicates whether the wireless communication device supports switching among a plurality of groups of SSSs without DCI 0_1 or DCI 1_1 or DCI 0_2 or DCI 1_2 monitoring;
  pdcchSkippingwithDCI-r17, which indicates whether the wireless communication device supports stopping PDCCH monitoring or PDCCH skipping with DCI 0_1 or DCI 1_1 or DCI 0_2 or DCI 1_2 monitoring;
  pdcchSkippingwithoutDCI-r17, which indicates whether the wireless communication device supports stopping PDCCH monitoring or PDCCH skipping without DCI 0_1 or DCI 1_1 or DCI 0_2 or DCI 1_2 monitoring;
  pdcchSkippingcapability2-r17, which indicates whether the wireless communication device supports a minimum delay (P) for switching among the SSSGs or PDCCH skipping, where P=10/12/22/25 symbols for a subcarrier spacing configuration numerology of $\mu$=0/1/2/3; and if the wireless communication device supports the minimum delay, the wireless communication device is to report to the wireless communication node one of: searchSpaceSetGroupSwitchingwithDCI-r17, searchSpaceSetGroupSwitchingwithoutDCI-r17, pdcchSkippingwithDCI-r17, pdcchSkippingwithoutDCI-r17, pdcchMonitoringAdaptationwithDCI-r17, or pdcchMonitoringAdaptationwithoutDCI-r17;
  jointPdcchSkippingAcrossCells-r17, which indicates whether the wireless communication device supports being configured with a group of cells and PDCCH skipping jointly over these cells.

If the feature configures the wireless communication device to support, the wireless communication device is to report to the wireless communication node one of: pdcchSkippingwithDCI-r17 or pdcchSkippingwithoutDCI-r17;
  pdcchMonitoringAdaptationwithDCI-r17, which indicates whether the wireless communication device supports switching among a plurality of groups of SSSs and PDCCH skipping of a plurality of different skipping duration values with DCI 0_1 or DCI 1_1 or DCI 0_2 or DCI 1_2 monitoring;
  pdcchMonitoringAdaptationwithoutDCI-r17, which indicates whether the wireless communication device supports switching among a plurality of groups of search space sets and PDCCH skipping of a plurality different skipping duration values without DCI 0_1 or DCI 1_1 or DCI 0_2 or DCI 1_2 monitoring;
  dataProcessingforpdcchSkipping-r17, which indicates whether the wireless communication device supports: monitoring PDCCH scheduling retransmission data, or PDCCH scheduling a PUSCH corresponding to a scheduling request (SR) on a physical uplink control channel (PUCCH) with pending state, or PDCCH monitoring after the wireless communication device receives a random access response (RAR) successfully for a random access preamble that is not selected by a medium access control (MAC) entity among contention-based random access preambles, or PDCCH during an Active Time which is activated by events except for running of drx-onDurationTimer or drx-InactivityTimer, or PDCCH monitoring after the wireless communication device monitors a search space set provided by recoverySearchSpaceId; and applying PDCCH skipping after all data are received successfully or all hybrid automatic request (HARQ) processing is complete or all uplink configured grant processing is complete.

If the feature configures the wireless communication device to support, the wireless communication device is to report to the wireless communication node one of: pdcchS-kippingwithDCI-r17, pdcchSkippingwithoutDCI-r17, pdc-chMonitoringAdaptationwithDCI-r17 or pdcchMonitoring-AdaptationwithoutDCI-r17;

dataProcessingforsearchSpaceSwitching-r17, which indicates whether the wireless communication device supports monitoring PDCCH scheduling retransmission data, or PDCCH scheduling a PUSCH corresponding to a scheduling request (SR) on a physical uplink control channel (PUCCH) with pending state, or PDCCH monitoring after the wireless communication device receives a random access response (RAR) successfully for a random access preamble that is not selected by a medium access control (MAC) entity among contention-based random access preambles, or PDCCH during an Active Time which is activated by events except for running of drx-onDurationTimer or drx-Inactivity-Timer, or PDCCH monitoring after the wireless communication device monitors a search space set provided by recoverySearchSpaceId; and applying SSSG switching after all data are received successfully.

If the feature configures the wireless communication device to support, the wireless communication device is to report to the wireless communication node one of: searchSpaceSwitchingwithDCI-r17 or searchSpaceSwitch-ingwithoutDCI-r17.

psSearchSpaceGroupMonitoring-r17, which indicates whether the wireless communication device supports PDCCH monitoring according to a power saving (PS) SSSG;

SearchSpaceGroup-r17, which indicates whether the wireless communication device supports SSSG switching between two or more groups of SSSs; or Numberofsearchspacegroup-r17, which indicates a number of search space set group supported by the wireless communication; or Numberofskippingduration-r17, which indicates a number of skipping duration supported by the wireless communication; or pdcchMonitoringSwitchingCapability-r17, which indicates whether the wireless communication device supports a minimum delay for SSSG switching or PDCCH skipping as 25 symbols for a subcarrier spacing of =3.

In some embodiments, the control information can includes at least one of (i) indication information of downlink control information (DCI), (ii) a switching timer associated with a normal SSSG or a regular SSSG, (iii) a power saving (PS) timer associated with a PS SSSG, (iv) a scheduling request (SR) transmission on a physical uplink control channel (PUCCH) with a pending state, (v) a random access response (RAR) received for a random access preamble that is not selected by a medium access control (MAC) entity among contention-based random access preambles, (vi) a RRC signaling parameter configuration related to the SSSG switching or the PDCCH skipping, or (vii) an adaptation pattern for the PDCCH monitoring, including SSSG switching and PDCCH skipping configured via RRC signaling.

In some embodiments, the wireless communication device can be at least one of a user equipment (UE) supporting new radio (NR) unlicensed band, a UE with reduced capability, a ULE supporting extended reality function, or a UE supporting NR band.

At least one aspect is directed to a system, method, apparatus, or a computer-readable medium. A wireless communication node may receive, from a wireless communication device, a plurality of capabilities of the wireless communication device. The wireless communication node may send, to the wireless communication device, control information. The wireless communication device can be configured to perform physical downlink control channel (PDCCH) monitoring using a group of search space sets (SSSs) selected from a plurality of search space set groups (SSSGs) according to the control information. The number of SSSG can be N, where N is an integer that is not smaller than 1, or each of the SSSGs can include a number of SSSs that is at least zero and at most equal to a maximum number of SSSs configured in a bandwidth part (BWP).

The wireless communication device can be configured to perform PDCCH skipping according to a skipping duration, responsive to at least one triggering event associated with the control information, and the skipping duration value can be determined among M PDCCH skipping duration values that are in a list of candidate skipping duration values configured via higher layer signaling, and M is an integer greater than or equal to 1.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIGS. 11A-111D show state diagrams depicting other scenarios for switching in PDCCH monitoring behavior with DCI indication, in accordance with some embodiments of the present disclosure.

DETAILED DESCRIPTION

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

1. Mobile Communication Technology and Environment

Figure 1:
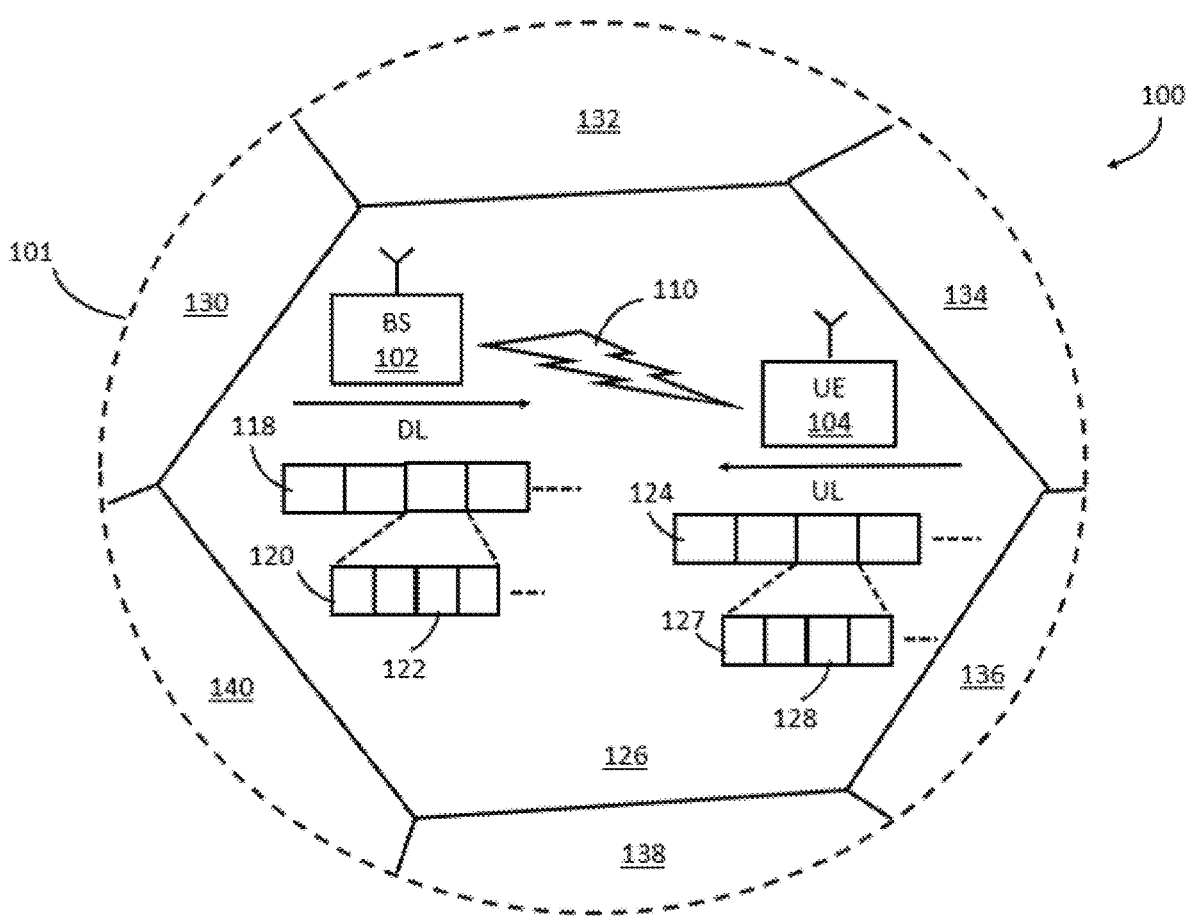
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127, which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
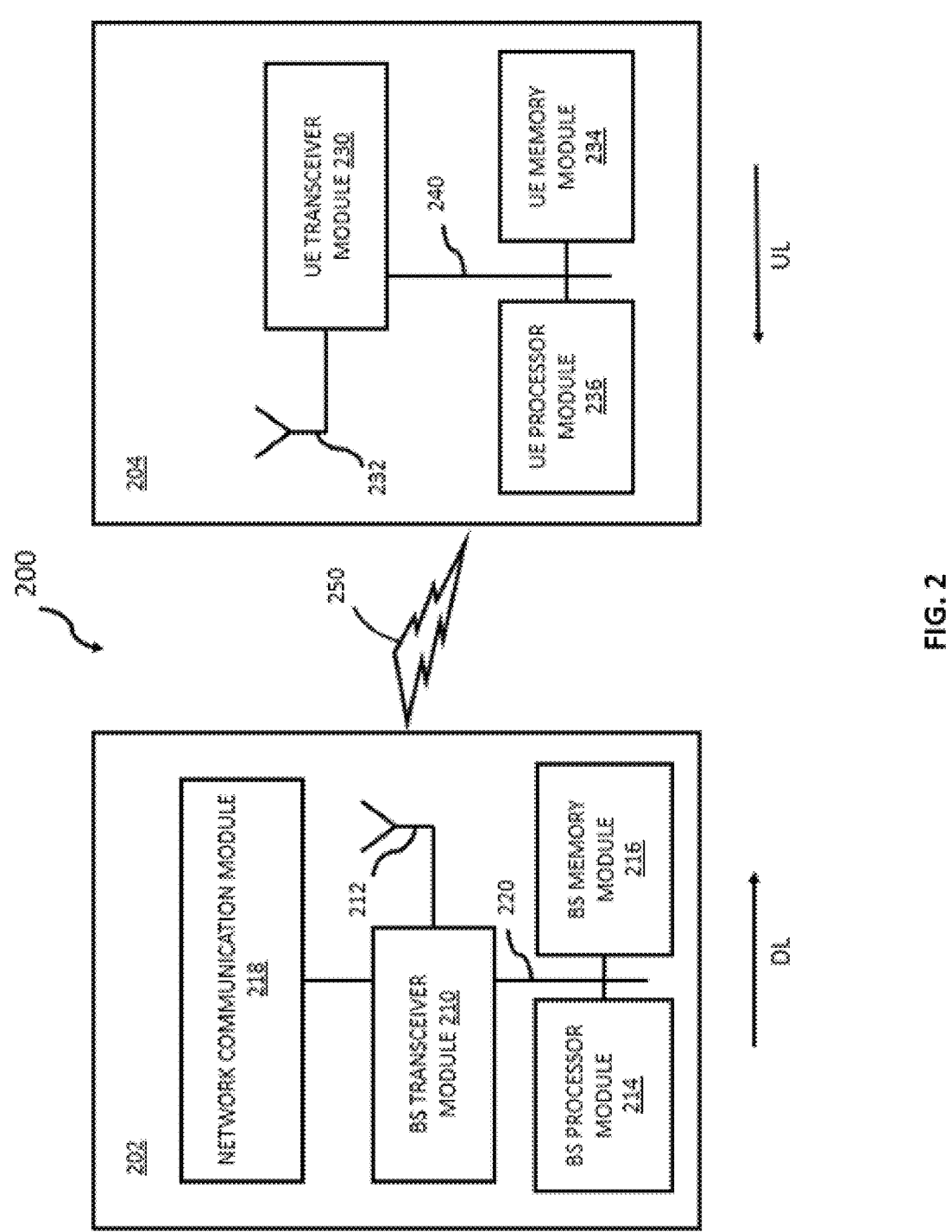
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Systems and Methods for Control Channel Monitoring

In the existing long term evolution (LTE) and 5G new radio access technology (NR) communication systems, the wireless communication device 104 or 204 (also referred to as UE) needs to know the uplink scheduling grant information for sending physical uplink shared channel (PUSCH) and downlink scheduling allocation information for receiving physical downlink shared channel (PDSCH). The information is included in the downlink control information (DCI) and is sent by the wireless communication node 102 or 202 to the wireless communication device 104 or 204 on the physical downlink control channel (PDCCH) in different DCI formats. Therefore, the wireless communication device 104 or 204 should first monitor the PDCCH.

The operation of the wireless communication device 104 or 204 to monitor the PDCCH may be performed on the control resource set and the PDCCH monitoring occasions for a search space set. The relevant monitoring parameters of the PDCCH can be included in the SearchSpace information element (IE), which is included in a radio resource control (RRC) signaling, where the searchSpaceId and the controlResourceSetId included in the SearchSpace IE indicate the search space set index and the index of CORESET applicable for this SearchSpace respectively. The searchSpace-Type included in SearchSpace IE indicates the search space type of the PDCCH that the wireless communication device 104 or 204 is to monitor, which includes common search space and UE-specific search space corresponding to different DCI formats. The DCI format 0-0 and 1-0, DCI format 2-0, DCI format 2-1, DCI format 2-2, DCI format 2-3 are included in common search space and the DCI format 0-1 and 1-0, DCI format 0-1 and 1-1, DCI format 0-2 and/or DCI format 1-2, or DCI format 3-0 and/or 3-1 are included in UE-specific search space. For the wireless communication device 104 or 204 supporting release 16, the DCI format 2-4/2-5/2-6 are also included in the common search space and the DCI format 2-0 and 2-5 are also included in the IAB-MT specific search space (MSS).

Each DCI format has a corresponding usage. For example, the usages of DCI format 0-0/0-1/0-2 totally include scheduling of PUSCH in one cell, and the usages of DCI format 1-0/1-1/1-2 totally include scheduling of PDSCH in one cell. One radio network temporary identifier (RNTI) is used to scramble the CRC of a DCI. The information of different functions in a DCI are identified as different fields. The fields defined in the DCI formats are mapped to the information bits $a_0$ to $a_{A-1}$. Each field is mapped in the order in which it appears in the description, including the zero-padding bit(s), if any, with the first field mapped to the lowest order information bit $a_0$ and each successive field mapped to higher order information bits. The most significant bit of each field is mapped to the lowest order information bit for that field, e.g. the most significant bit of the first field is mapped to $a_0$.

The duration included in the SearchSpace IE is a duration of $T_s < k_s$ indicating the number of slots that the wireless communication device 104 or 204 monitors PDCCH for search space set s. The parameter monitoringSlotPeriodicityAndOffset included in the SearchSpace IE indicates a PDCCH monitoring periodicity of $k_s$ slots and a PDCCH monitoring offset of Os slots. The parameter monitoringSymbolsWithinSlot $N_{symb}$ included in the SearchSpace IE indicates the first symbol(s) for PDCCH monitoring within a slot for PDCCH monitoring.

For the bit-mapping indication of the parameter monitoringSymbolsWithinSlot, the most significant (left) bit represents the first orthogonal frequency-division multiplexing (OFDM) in a slot, and the second most significant (left) bit represents the second OFDM symbol in a slot and so on. The bit(s) set to one identify the first OFDM symbol(s) of the control resource set within a slot.

If the monitoringSymbolsWithinSlot indicates to the wireless communication device 104 or 204 to monitor PDCCH in a subset of up to three consecutive symbols that are the same in every slot where the wireless communication device 104 or 204 monitors PDCCH for all search space sets, the wireless communication device 104 or 204 does not expect to be configured with a PDCCH subcarrier spacing (SCS) other than 15 kHz if the subset includes at least one symbol after the third symbol. The wireless communication device 104 or 204 does not expect to be provided a first symbol and a number of consecutive symbols for a control resource set (CORESET) that results to a PDCCH candidate mapping to symbols of different slots. The wireless communication device 104 or 204 does not expect any two PDCCH monitoring occasions (MOs) on an active DL BWP, for a same search space set or for different search space sets, in a same CORESET to be separated by a non-zero number of symbols that is smaller than the CORESET duration.

The specific PDCCH monitoring occasion(s) can be obtained as follows. For search space set s, the wireless communication device 104 or 204 can determine that a PDCCH monitoring occasion(s) exists in a slot with number $$n_{s,f}^{\mu}$$

in a frame with number $n_f$ if $$\left(n_f \cdot N_{slot}^{frame,\mu} + n_{s,f}^{\mu} - O_s\right) \bmod k_s = 0.$$

The wireless communication device 104 or 204 can monitor PDCCH for search space set s for $T_s$ consecutive slots, starting from slot $$n_{s,f}^{\mu},$$

and may not monitor PDCCH for search space set s for the next $k_s - T_s$ consecutive slots.

When a DRX cycle is configured, the Active Time for serving cells in a DRX group includes the time while:

drx-onDurationTimer or drx-InactivityTimer configured for the DRX group is running; or drx-RetransmissionTimerDL or drx-RetransmissionTimerUL is running on any Serving Cell in the DRX group; or ra-ContentionResolutionTimer or msgB-ResponseWindow is running; or a scheduling request is sent on PUCCH and is pending; or a PDCCH indicating a new transmission addressed to the C-RNTI of the MAC entity has not been received after successful reception of a Random Access Response for the Random Access Preamble not selected by the MAC entity among the contention-based Random Access Preamble.

Serving cells may be configured by RRC in two groups. When RRC does not configure a secondary DRX group, there is only one DRX group. When two DRX groups are configured, each group of serving cells referred to as a DRX group, can be configured by RRC with its own set of parameters drx-onDurationTimer and drx-InactivityTimer. When two DRX groups are configured, the two groups share the parameter values drx-SlotOffset, drx-RetransmissionTimerDL, drx-RetransmissionTimerUL, drx-LongCycleStartOffset, drx-ShortCycle (optional), drx-ShortCycleTimer (optional), drx-HARQ-RTT-TimerDL, and/or drx-HARQ-RTT-TimerUL.

The MAC entity may be configured by RRC with a DRX functionality that controls the UE's PDCCH monitoring activity for the MAC entity's C-RNTI, CI-RNTI, CS-RNTI, INT-RNTI, SFI-RNTI, SP-CSI-RNTI, TPC-PUCCH-RNTI, TPC-PUSCH-RNTI, and TPC-SRS-RNTI. When using DRX operation, the MAC entity shall also monitor PDCCH according to requirements. When in RRC_CONNECTED, if DRX is configured, for all the activated Serving Cells, the MAC entity may monitor the PDCCH discontinuously using the DRX operation; otherwise the MAC entity shall monitor the PDCCH.

For the Type3-PDCCH CSS (Type-3 CSS) and UE-specific SS, a Type3-PDCCH CSS set configured by SearchSpace in PDCCH-Config with searchSpaceType=common for DCI formats with CRC scrambled by INT-RNTI, SFI-RNTI, TPC-PUSCH-RNTI, TPC-PUCCH-RNTI, TPC-SRS-RNTI, or CI-RNTI and, only for the primary cell, C-RNTI, MCS-C-RNTI, CS-RNTI(s), or PS-RNTI and a USS set configured by SearchSpace in PDCCH-Config with searchSpaceType=ue-Specific for DCI formats with CRC scrambled by C-RNTI, MCS-C-RNTI, SP-CSI-RNTI, CS-RNTI(s), SL-RNTI, SL-CS-RNTI, or SL-L-CS-RNTI.

The existing power saving techniques for 5G NR include (i) the wake-up indication, (ii) the minimum applicable scheduling offset indication, (iii) the indication of dormancy-like behavior transition on Scell(s) and (iv) the search space set switching indication. The wake-up indication indicated by DCI format 2-6 can indicate to wireless communication device 104 or 204 to, or not to, wake up in the next long DRX cycle. Then the physical layer of the wireless communication device 104 or 204 can send the value to MAC layer (higher layer) to determine whether starting or not starting the drx-onDuration timer in the next long DRX cycle.

The minimum applicable scheduling offset indication indicated by DCI format 0-1/1-1 can be used to determine the minimum applicable K2 for the active UL BWP, the minimum applicable K0 value for the active DL BWP and the minimum applicable value of the aperiodic CSI-RS triggering offset for an active DL BWP. The minimum K2 parameter denotes minimum applicable value(s) for the time domain resource assignment (TDRA) table for PUSCH, and the minimum K0 parameter denotes minimum applicable value(s) for the TDRA table for PDSCH and for A-CSI RS triggering offset(s). The value of K2 represents the slot offset between DCI and its scheduled PUSCH. The value of K0 represents the slot offset between DCI and its scheduled PDSCH. The value of A-CSI RS triggering offset(s) represents the offset between the slot containing the DCI that triggers a set of aperiodic NZP CSI-RS resources and the slot in which the CSI-RS resource set is transmitted. The minimum applicable scheduling offset (e.g., $K0_{min}$, $K2_{min}$, or A-CSI RS triggering offset(s)) makes the wireless communication device 104 or 204 relax the PDCCH decoding process time to reduce some decoding power consumption.

The indication of dormancy-like behavior transition on Scell(s) indicated by DCI format 2-6/0-1/1-1 can trigger the wireless communication device 104 or 204 to perform dormancy behavior on some Scells. If the wireless communication device 104 or 204 is indicated by a '0' value for the activated SCell in the corresponding group of configured SCells, the wireless communication device 104 or 204 can switch to, or stay, in the dormant BWP for the SCell. Otherwise, if the wireless communication device 104 or 204 is indicated by a '1' value and a current active DL BWP is the dormant DL BWP, the wireless communication device 104 or 204 can switch to, or stay, in the non-dormant BWP for the SCell. The dormant BWP and the non-dormant BWP are configured by high layer parameter.

The search space set switching indication indicated by DCI format 2-0 can indicate a group from two groups of search space sets for PDCCH monitoring for scheduling on the serving cell. The wireless communication device 104 or 204 can monitor PDCCH according to the search space sets with the indicated group index.

In the existing communication systems including long term evolution (LTE) and 5G new radio access technology (NR) communication systems, there are many distinctive classes of use cases, for example, enhanced mobile broadband (eMBB), massive machine type communication (mMTC) and ultra-reliable and low-latency communication (URLLC), etc. These use cases may be associated with corresponding requirements, such as higher data rate, higher reliability, lower latency and/or very low device energy to support a longer battery life time, etc. Though these requirements are artificial, they are available for current or further mobile communication, such as wearable devices, extended reality (XR) applications including cloud gaming and augmented reality (AR)/virtual reality (VR) applications, etc. Techniques to achieve the requirement of very low device energy and save UE power consumption can include discontinuous reception (DRX), PDCCH carrying downlink control information (DCI) with wake-up or not wake-up indication (e.g., wake-up signal denoted as WUS), secondary cell (SCell) dormancy behavior and cross-slot scheduling (e.g., minimum applicable scheduling offset indication for the minimum applicable K0, the minimum applicable K2 and the minimum applicable value of aperiodic CSI-RS triggering offset). However, from the below analysis, it is observed that power consumption in physical downlink control channel (PDCCH)-only state still domains the most, where the PDCCH-only state represents the behavior that a UE monitors a PDCCH not carrying a DCI.

Figure 3A:
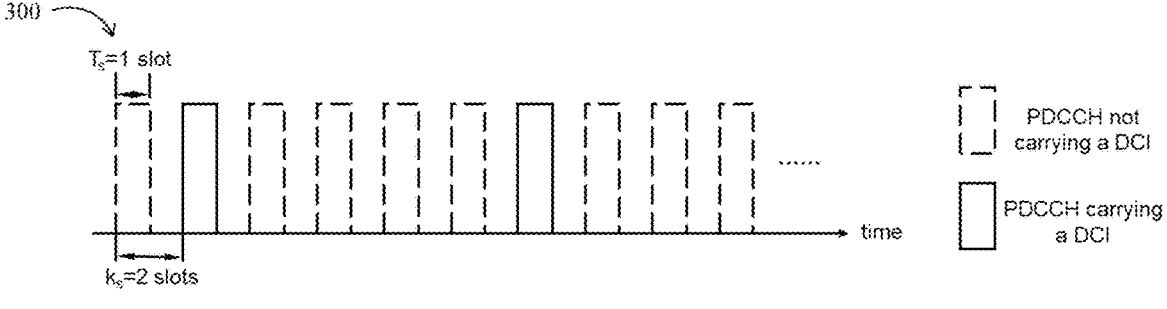
FIGS. 3A and 3B show diagrams illustrating example PDCCH monitoring without and with DRX, respectively, in accordance with some embodiments of the present disclosure.
Figure 3B:
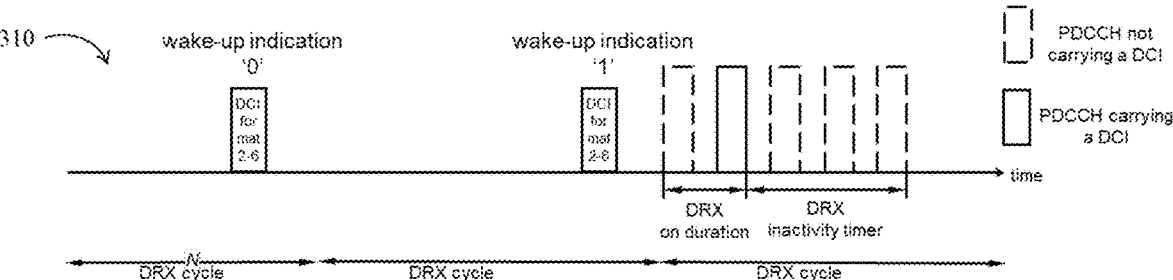

Generally, the wireless communication device 104 or 204 needs to keep monitoring PDCCH in PDCCH monitoring occasions to avoid missing any uplink (UL)/downlink (DL) transmission information. The PDCCH monitoring occasion(s) can be determined by SearchSpace (SS) information element (IE) including parameters of periodicity such $k_s$, a duration $T_s$ in a periodicity and an offset $O_s$ associated with the start position of a periodicity. Referring to FIGS. 3A and 3B, diagrams 300 and 310 illustrating example PDCCH monitoring without and with DRX are shown respectively, in accordance with some embodiments of the present disclosure. FIG. 3A shows an example scenario of PDCCH monitoring without DRX. The PDCCH monitoring occasions are configured such that $T_s$=1 slot and $k_s$=2 slots. In the example of FIG. 3B, the wireless communication device 104 or 204 performs PDCCH monitoring only during DRX Active Time, and responsive to the wake-up indication being set to 1. The discontinuous reception (DRX) mechanism and wake-up indication can be induced to ensure the wireless communication device 104 or 204 to avoid some PDCCH monitoring power consumption during the DRX Active Time. As such, the PDCCH monitoring shown in FIG. 3A consumes much more power than the PDCCH monitoring shown in FIG. 3B. Moreover, most of the power consumption associated with the PDCCH monitoring of FIG. 3B can be avoided, especially when the data arrival is relatively sparse and the DRX inactivity timer is relatively long.

Figures 4A, 4B:
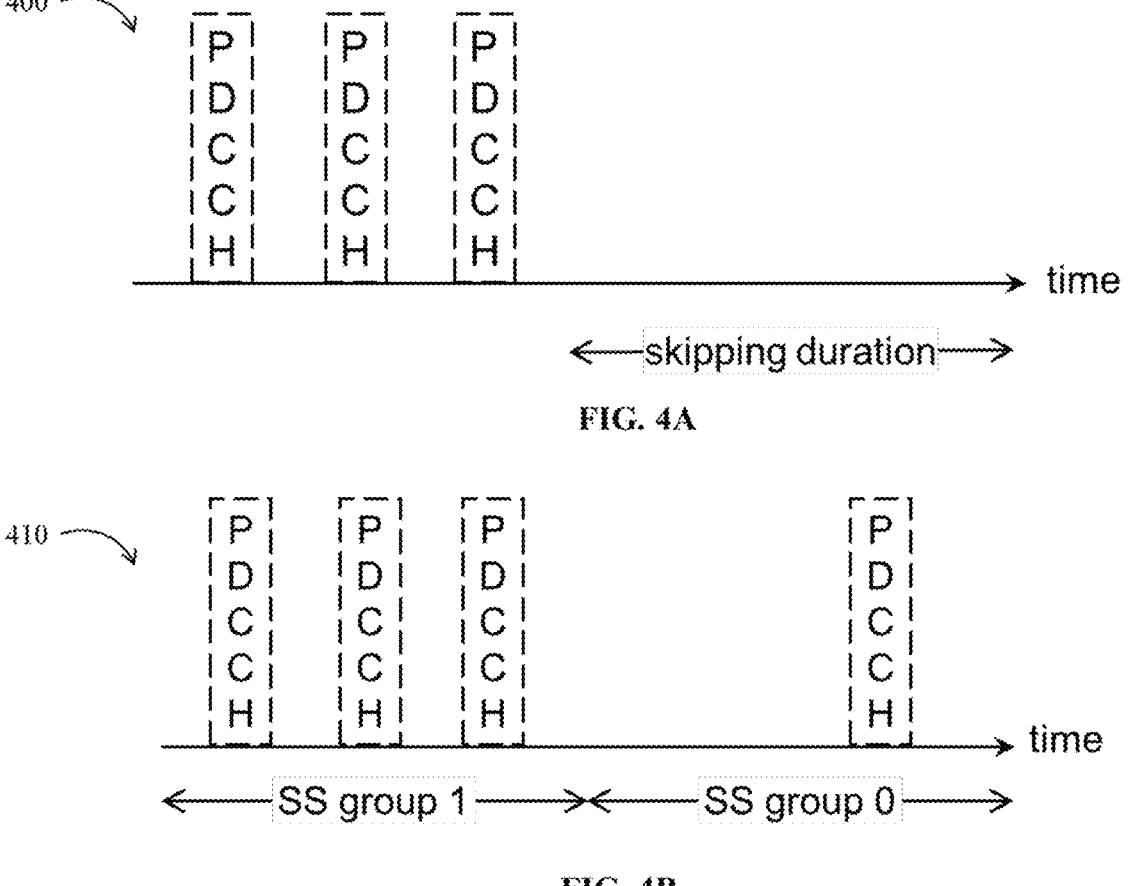
FIGS. 4A and 4B show diagrams illustrating examples of a skipping scheme and a search space set (SSS) group switching scheme, respectively, in accordance with some embodiments of the present disclosure.

Referring to FIGS. 4A and 4B, diagrams 400 and 410 illustrating examples of a skipping scheme and a search space set (SSS) group switching scheme are shown respectively, in accordance with some embodiments of the present disclosure. The PDCCH skipping scheme, e.g., as illustrated in FIG. 4A, can provide the wireless communication device 104 or 204 with a short duration to stop monitoring PDCCH, and therefore can reduce much power consumption in PDCCH-only state for the wireless communication device 104 or 204. The PDCCH switching scheme, e.g., as illustrated in FIG. 4B, can trigger the wireless communication device 104 or 204 to change the PDCCH monitoring behavior to adapt to the real-time data scheduling to save power. For instance, if there is no traffic arrival after a time duration, the wireless communication device 104 or 204 can stop monitoring PDCCH frequently and start monitoring PDCCH sparsely by changing the search space set(s) (SSS). The PDCCH switching scheme illustrated in FIG. 4B is referred to as SSS group (SSSG) switching. The wireless communication device 104 or 204 can monitor the search space set group 0 when the data arrives sparsely, and the wireless communication device 104 or 204 can monitors the search space set group 1 when the data arrives frequently.

The two schemes can be applied for different situations. For example, if the wireless communication device 104 or 204 should not be scheduled data for a short or long duration, PDCCH skipping scheme can reduce more power than that reduced by the SSS group switching scheme because the wireless communication device 104 or 204 does not monitor any PDCCH occasion(s) during the skipping period. But if the data arrival is frequent or periodic for the wireless communication device 104 or 204, it is appropriate to provide the wireless communication device 104 or 204 with search space set(s) including a suitable PDCCH periodicity ks and a suitable duration $T_s$.

Figure 5A:
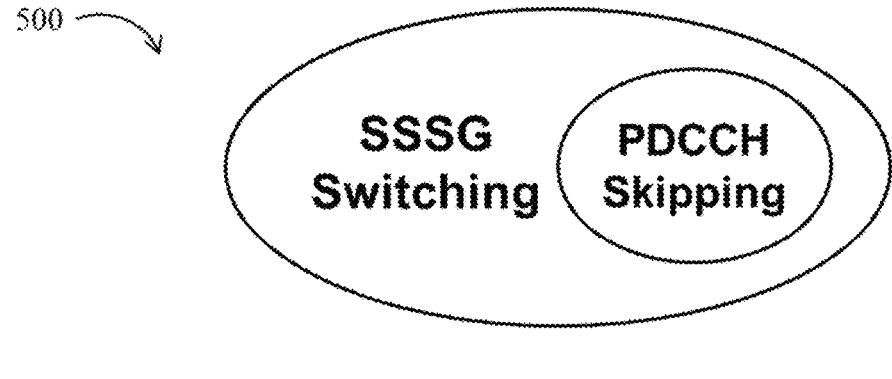
FIGS. 5A-5C show diagrams depicting various alternatives for DCI based PDCCH monitoring adaptation in active time for an active BWP, in accordance with some embodiments of the present disclosure.
Figure 5B:
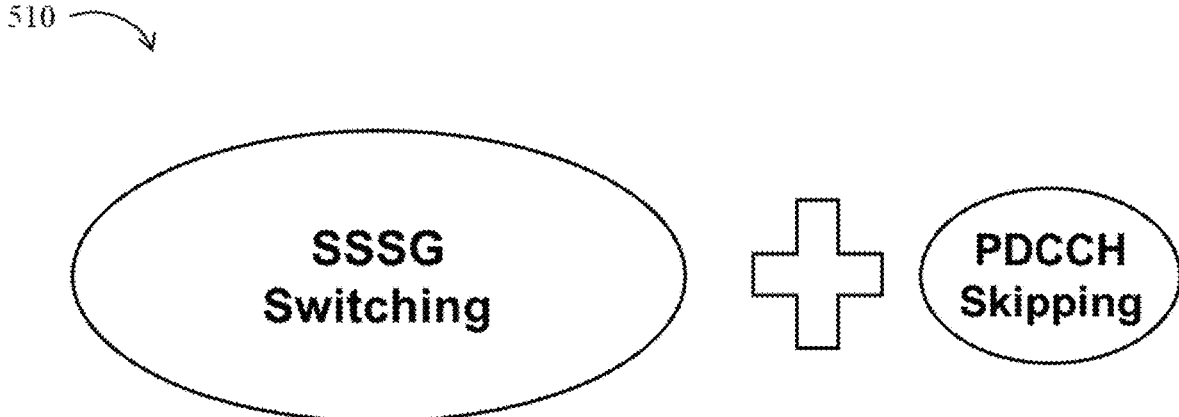
Figure 5C:
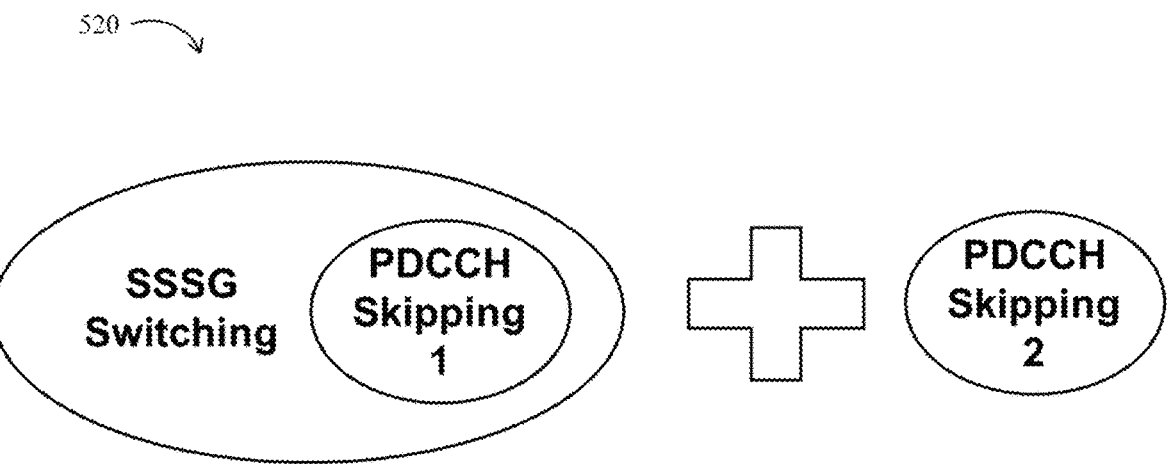

In the current disclosure, various alternatives can be considered for DCI based PDCCH monitoring adaptation in active time for an active BWP for power saving. Referring to FIGS. 5A-5C, diagrams 500, 510 and 520 depicting various DCI based PDCCH monitoring adaptation approaches in active time for an active BWP are shown, in accordance with some embodiments of the present disclosure. Referring to FIG. 5A, diagram 500 represents a first PDDCH monitoring approach that supports PDCCH monitoring adaptation including skipping for a duration via SSSG switching. Specifically, the first approach includes enhancement of Rel-16 SSSG switching to support PDCCH monitoring adaptation including skipping for a duration. The PDCCH skipping can be achieved by monitoring a SSSG, which is configured by higher layer parameters. The PDCCH monitoring adaptation pattern can include only SSSG switching.

Referring to FIG. 5B, diagram 510 represents a second PDDCH monitoring approach that supports both skipping PDCCH monitoring for a duration and SSSG switching. Specifically, the second approach incudes enhancement of DCI(s) utilized for Rel-16 power saving adaptation to support both skipping PDCCH monitoring for a duration and SSSG switching. According to this approach, the PDCCH skipping is not achieved by monitoring a SSSG, and is configured by higher layer parameters including at least one skipping duration value.

Referring to FIG. 5C, diagram 520 represents a third PDDCH monitoring approach that is a combination of both the first and second approaches. Specifically, the approach can be viewed as an enhancement of DCI(s) utilized for Rel-16 power saving adaptation for supporting both skipping PDCCH monitoring for a duration and SSSG switching including a SSSG for PDCCH skipping. Two types of PDCCH skipping are supported. The PDCCH skipping 1 is achieved by monitoring a SSSG, and PDCCH skipping 2 does not involve monitoring a SSSG and is configured by higher layer parameters including at least one skipping duration value.

Figure 6:
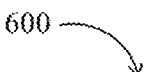
FIG. 6 shows a flowchart illustrating a method for control channel monitoring, in accordance with some embodiments of the present disclosure.
Figure 6:
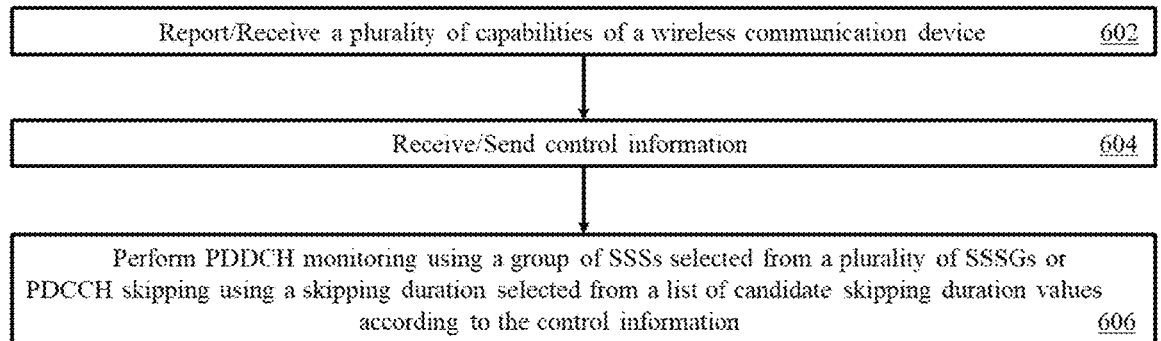

Referring to FIG. 6, a flowchart illustrating a method 600 for control channel monitoring. The method 600 can include the wireless communication device 104 and 204 reporting, and the wireless communication node 102 and 202 receiving, a plurality of capabilities of the wireless communication device 104 or 204 (STEP 602). The method 600 can include the wireless communication node 102 or 202 sending, and the wireless communication device 104 or 204 receiving, control information (STEP 604). The method 600 can include the wireless communication device 104 or 204 performing PDCCH monitoring using a group of search space sets (SSSs) selected from a plurality of SSSGs or performing PDCCH skipping using a skipping duration selected from a list of candidate skipping duration values according to the control information (STEP 606). The number of SSSGs can be N, where N is an integer greater than or equal to 0. Each of the SSSGs can include a number of SSSs that is at least zero and at most equal to a maximum number of SSSs configured in a bandwidth part (BWP). The number of skipping duration values can be M, where M is an integer greater than 0.

As discussed in further detail below, the method 600 can be applied according to various embodiments. These embodiments can be applied for new radio (NR) including AR/VR, XR, and/or eMBB/mMTC/URLLC scenarios, and/or NR-unlicensed spectrum (NR-U).

The PDCCH monitoring adaptation configurations described herein, including SSSG and PDCCH skipping, can be used for a respective Type3-PDCCH CSS set or USS set for PDCCH monitoring on a serving cell. In the following, the number of the monitoring occasions (MOs) within a slot for PDCCH monitoring is noted as $N_{MO}$. The number of available PDCCH monitoring occasions within a slot ($N_{symb}$) can be determined (e.g., by the wireless communication device 104 or 204) using the configured monitoring-SymbolsWithinSlot, the CORESET duration and one or more search space sets associated with the CORESET.

In the following, the number of monitoring slots or symbols during a long period determined by the search space sets in a SSSG is noted as $N_{MS}$. For the same period which is equal to the longest PDCCH monitoring periodicity $k_s$ of all search space sets in the BWP, the search space set group with a larger $N_{MS}$ represents that the search space set group has a denser PDCCH monitoring behavior.

Embodiment 1: SSSG and PDCCH Skipping

In some embodiments, the wireless communication device 104 or 204 can perform PDCCH monitoring (STEP 606) according to a search space set group (SSSG) based on a plurality of triggering events or a plurality of control information transmitted (in STEP 604) by the wireless communication node 102 or 202. The number of search space set groups (N) can be not less than 2, and the number of search space set(s) included in a SSSG can be not less than 0 and not larger than a maximum number of search space sets configured in a bandwidth part (BWP).

In some embodiments, the wireless communication device 104 or 204 can perform (STEP 606) PDCCH skipping according to a triggered skipping duration value determined based on a plurality of triggering events related to a plurality of control information transmitted (in STEP 604) by the wireless communication node 102 or 202. The wireless communication device 104 or 204 can determine the skipping duration value among M PDCCH skipping duration values. The integer M can be not less than 1 and the PDCCH skipping duration values can be in a list of candidate skipping duration values. The list of candidate skipping duration values can be configured by higher layer parameters. In some embodiments, the unit of skipping duration value can be a slot or a millisecond.

Power Saving Search Space Set Group

In some embodiments, the search space set group(s) configured by the wireless communication node 102 or 202 in the BWP can include at least one power saving (PS) SSSG. The PS SSSG may not be configured with a search space set by the higher layer parameters, or the number of search space set in the PS SSSG is 0.

Method 1: Definition of SSSG

In some embodiments, the network or the wireless communication node 102 or 202 can configure at most N search space groups per BWP. The group ID can be ordered as 0, 1, . . . , N−1. For PS SSSG with group ID x, there may be no search space set associated with group ID x. For the list of search space group IDs except for group ID x, at least one search space can be associated with them.

Method 2: Definition of SSSG

In some embodiments, the search space set group(s) configured by the wireless communication node 102 or 202 in the BWP can include at least one power saving (PS) SSSG. At least one of the PDCCH monitoring parameters of any of the search space set(s) included in the PS SSSG can have restricted conditions. The restricted conditions can include at least one of (i) the bitmap of monitoring symbols within a slot is all zeros, (ii) the duration $T_s$ is 0 slot, (iii) the PDCCH monitoring periodicity $k_s$ is NULL, (iv) the PDCCH monitoring periodicity $k_s$ is invalid, (v) the PDCCH monitoring offset $O_s$ is equal to $(k_s−1)$ slots, and/or (vi) the PDCCH monitoring occasion(s) is equal to 0. The PS SSSG can be associated with a power saving (PS) timer. The wireless communication device 104 or 204 may not monitor PDCCH in type-3 CSS sets and USS sets during decrementing or running the PS timer per slot.

Normal Search Space Set Group

The search space set group(s) configured by the wireless communication node 102 or 202 in the BWP can include at least one normal SSSG. The normal SSSG can include at least one search space set. The at least one search space set of the normal SSSG can belong to Type-3 common search space type and/or UE-specific search space type.

Regular Search Space Group

The search space set group(s) configured by the wireless communication node 102 or 202 in the BWP can include a regular SSSG, which includes all search space sets configured in the DL BWP in a cell or across a group of cells bundled for SSSG switching or PDCCH skipping. The regular SSSG may not needed to be configured by higher layer parameter(s). The regular SSSG may not have a group ID.

A switching timer may be associated with the normal SSSG or the regular SSSG. In some implementations, the switching timer may be set to a value configured by a higher layer parameter when the wireless communication device 102 or 202 starts monitoring PDCCH according to a normal SSSG or according to a regular SSSG (e.g., all search space sets configured in the active DL BWP in a cell or across a group of cells bundled for SSSG switching or PDCCH skipping). In some implementations, the switching timer can be set to the value configured by a higher layer parameter or can be predetermined when the wireless communication device 102 or 202 is monitoring PDCCH according to a normal SSSG or a regular SSSG, and detects any PDCCH, or a PDCCH with scheduling DCI, or a PDCCH with SSSG switching indication.

Search Space Set Group Classification

In some embodiments, the search space set groups can be classified based on at least one of a plurality of parameters. The plurality of parameters can include (i) RNTI types including at least one of the C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, and AI-RNTI, (ii)

search space set ID including at least one of 1, 2, 3, . . . , and 39, (iii) search space type including at least Type-3 CSS type and USS type, (iv) CORESET ID associated with the group of search space set(s) including at least one of 0, 1, 2, 3, 4 and 5, (v) the density of PDCCH monitoring occasions during a duration including at least one of monitoring zero slot per slot, monitoring one slot per $k_s$ slots, monitoring two slots per $k_s$ slots, . . . , monitoring $(k_s−1)$ slots per $k_s$ slot and monitoring one slot per slot, and/or (vi) a threshold related to the values of PDCCH monitoring periodicity $k_s$, or offset $O_s$, or duration $T_s$ for at least one of the search space sets in a SSSG.

For example, the wireless communication device 104 or 204 can be provided N=2 SSSGs with group IDs 0 and 1. At least one of the search space sets of SSSG 0 can have different search space type compared to the search space sets of SSSG 1. For instance, SSSG 0 can include 4 type-3 CSS sets and 2 USS sets and SSSG 1 can include 2 USS sets. In another example, the wireless communication device 104 or 204 can be provided N=3 SSSGs with group IDs 0, 1 and 2. The three SSSGs can have different PDCCH monitoring densities. For instance, SSSG 0 can include 1 search space set, SSSG 1 can include all type-3 CSS sets and USS sets configured in active DL BWP, and SSSG 2 can include zero search space set. According to yet another example, the wireless communication device 104 or 204 can be provided N=2 SSSGs with group IDs 0 and 1. At least one of the search space sets of SSSG 0 can have different associated CORESET with the search space sets of SSSG 1. For instance, all search space sets of SSSG 0 can be associated with CORESET 0, and all search space sets of SSSG 1 can be associated with CORESET 1. For example, for PS SSSG, the value of Ts for each search space sets is equal to 0. For example, for dense SSSG, the value of both ks and Ts for each search space set are not larger than 1 and larger than 0.

Configuration Structure of SSSG and PDCCH Skipping

The SSSG switching or PDCCH skipping can be triggered with an indication of (or within) DCI. A bitwidth of an indication field of DCI is W, where W is an integer and not less than 1. In some implementations, the value of W can be determined, e.g., by the wireless communication device 104 or 204), based on functions related to SSSG switching or PDCCH skipping, or according to the value of N or M provided by higher layer parameters. The triggering methods can include at least one of:

1. At least one bit of the bit-field is used to indicate at least one of the followings:
   i. Enable or disable PDCCH monitoring according to a SSSG or SSSG switching;
   ii. Enable or disable PDCCH monitoring according to a SSSG configured with restrictions;
   iii. Enable or disable PDCCH skipping based on a skipping duration;
   iv. Enable or disable monitoring PDCCH according to all search space sets configured in the active DL BWP in a cell or across a group of cells bundled for SSSG switching or PDCCH skipping.

2. The leading bit or most significant bit (MSB) of the field for SSSG switching or PDCCH skipping indication can be used to indicate at least one of the followings:
   i. Enable or disable PDCCH monitoring according to a SSSG or SSSG switching;
   ii. Enable or disable PDCCH monitoring according to a SSSG configured with restrictions;
   iii. Enable or disable PDCCH skipping based on a skipping duration;

iv. Enable or disable monitoring PDCCH according to all search space sets configured in the active DL BWP in a cell or across a group of cells bundled for SSSG switching or PDCCH skipping.

3. At least one bit of the bit-field, or the remaining bit(s) or non-MSB of the field for SSSG switching or PDCCH skipping indication can be used to indicate at least one of the followings:

i. The SSSG ID that the UE shall switch to monitor PDCCH;

ii. The SSSG ID determined based on the current monitored SSSG and the value of the bit field indication that the UE shall switch to monitor PDCCH;

iii. The value of skipping duration;

iv. All search space sets configured in the active DL BWP in a cell or across a group of cells bundled for SSSG switching or PDCCH skipping;

v. The SSSG configured with restrictions.

4. For PS SSSG, the wireless communication device 104 or 204 shall switch to a default SSSG after the PS SSSG expires, where 'the PS SSSG expires' represents at least one of the followings:

i. The PS timer is decremented per slot, per symbol or per millisecond to 0 or the PS timer expires;

ii. The duration to determine the valid time of the PS SSSG ends.

iii. A plurality of triggering events related to data processing are met by the wireless communication device 104 or 204. The plurality of triggering events related to data processing can include at least one of (a) PDCCH decoding, (b) starting running DRX-RetransmissionTimer DL/UL, (c) SR transmission on PUCCH with pending state, (d) RAR receiving or PDCCH decoding with the CRC scrambled by RA-RNTI for the Random Access Preamble not selected by MAC entity among the contention-based Random Access Preamble.

5. For PDCCH skipping, the wireless communication device 104 or 204 shall to switch to a default SSSG after the end of skipping duration.

In some implementations, the SSSG switching or PDCCH skipping can be triggered without DCI indication. For instance, (i) the wireless communication device 104 or 204 can switch from a normal SSSG or a regular SSSG to PS SSSG or PDCCH skipping after the switching timer expires, (ii) the wireless communication device 104 or 204 can switch from a regular SSSG to a normal SSSG after the switching timer expires, (iii) the wireless communication device 104 or 204 can switch from a denser SSSG to a sparser SSSG after the switching timer expires, where the denser SSSG can include more search space sets, or more RNTI types, or more PDCCH monitoring occasions, or larger $T_s$ values, or smaller $k_s$ values than sparser normal SSSG, (iv) the wireless communication device 104 or 204 can switch from PS SSSG or PDCCH skipping to a default SSSG when the plurality of triggering events related to data processing are met by the wireless communication device 104 or 204, or (v) the default SSSG can be configured by RRC parameter or predefined among the normal SSSG(s) or the regular SSSG.

Two SSSGs Including a SSSG to Achieve PDCCH Skipping (N=2)

In some implementations, the number of search space set groups supported by the wireless communication device 104 or 204 can be 2 in a DL BWP. The two search space set groups can include one normal SSSGs and one PS SSSG.

The normal SSSG can include at least one search space set having a Type-3 common search space type and/or a UE-specific search space type. In the following, the PDCCH monitoring behavior according to all search space sets configured in the active DL BWP is noted as a regular PDCCH monitoring behavior. Also, "all search space sets" refers to all Type3 CSS sets and USS sets configured in the DL BWP on a serving cell. The DL BWP can be the current active BWP or the switched BWP indicated by DCI or triggered by BWP inactivity timer 2-Bitfield DCI Indication and Implicit Triggering Event In some implementations, the wireless communication device 104 or 204 can perform PDCCH monitoring according to all search space sets configured in the DL BWP when DCI indicates to the wireless communication device 104 or 204 can be to disable the SSSG switching or stop monitoring PDCCH according to SSSG. The bitwidth of the SSSG switching indication can be 2, and the leading bit or the MSB can be used to disable or enable the SSSG switching, or can be used to disable or enable the PDCCH monitoring according to the all search space sets configured in the DL BWP.

After receiving the DCI indication, if the leading bit of SSSG switching indication is set to '0', the wireless communication device 104 or 204 will stop monitoring PDCCH according to a SSSG and will start monitoring PDCCH according to all search space sets configured in the DL BWP. After receiving DCI indication, if the leading bit of SSSG switching indication is set to '1', the wireless communication device 104 or 204 will stop current PDCCH monitoring behavior and will start monitoring PDCCH according to a SSSG based on the remaining bit(s) right after or adjacent with the leading bit indication. If the remaining bit(s) is set to '0', the wireless communication device 104 or 204 will monitor SSSG with identity 0, and/or if the remaining bit(s) is set to '1', the wireless communication device 104 or 204 will monitor SSSG with identity 1.

When the leading bit of the SSSG switching indication is set to '0', the remaining bit(s) right after or adjacent with the leading bit can be to indicate whether the wireless communication device 104 or 204 should start monitoring PDCCH according to all search space sets for a group of serving cells or not. When the leading bit of the SSSG switching indication is set to '1', the remaining bit(s) right after or adjacent with the leading bit is used to indicate a SSSG and the wireless communication device 104 or 204 should start monitoring PDCCH according to the indicated SSSG.

The wireless communication device 104 or 204 can perform PDCCH monitoring according to all search space sets configured in the DL BWP after PS SSSG is expired. The wireless communication device 104 or 204 can perform PDCCH monitoring according to normal SSSG after PS SSSG is expired if RRC signaling configures the wireless communication device 104 or 204 to monitor PDCCH according to the normal SSSG after PS SSSG is expired. Both of the two SSSGs can be used to reduce PDCCH monitoring, so PDCCH monitoring according to all search space sets can be used for SSSG switching for dense data-arrival traffics.

Figure 7:
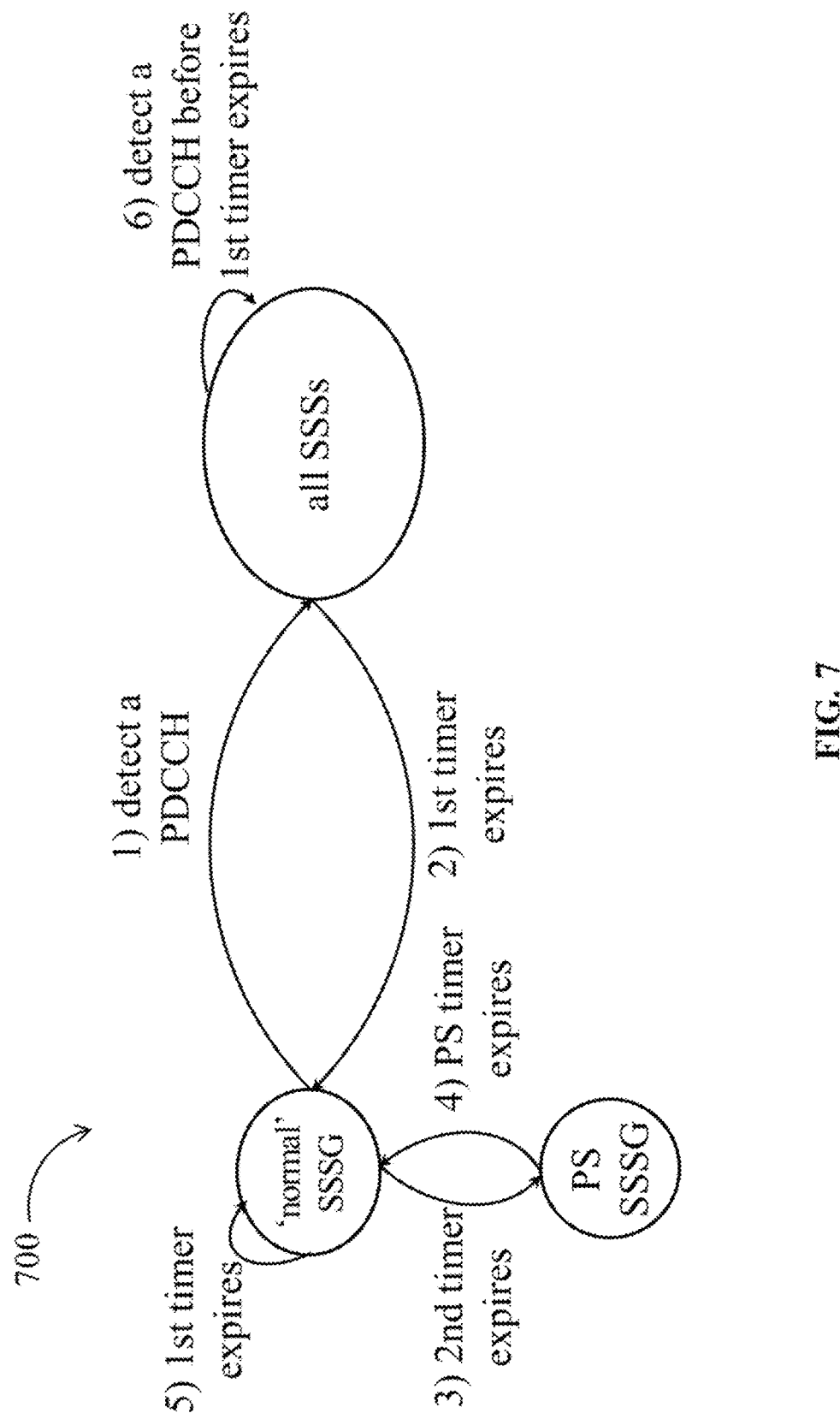
FIG. 7 shows a state diagram illustrating a first example for two SSSGs switching without DCI indication, in accordance with some embodiments of the present disclosure.

Referring to FIG. 7, a state diagram 700 illustrating a first example for two SSSGs switching without DCI indication is shown, in accordance with some embodiments of the present disclosure. A first timer and a second timer can be used (e.g., by the wireless communication device 104 or 204) for SSSG switching. The first timer may not be larger than the second timer. The triggering events associated with FIG. 7 include:

1) If a PDCCH is detected during the first timer and 'normal' SSSG is the current SSSG, the wireless communication device 104 or 204 can switch to all SSSs and stop the first timer.

2) If the first timer expires and all SSSs is the current monitored SSSG, the wireless communication device 104 or 204 can switch to monitor 'normal' SSSG and reset the $1^{st}$ timer.

3) If the second timer expires and 'normal' SSSG is the current monitored SSSG, the wireless communication device 104 or 204 can switch to PS SSSG.

4) A PS timer can be used as a skipping duration. After the PS timer expires, the wireless communication device 104 or 204 can switch to 'normal' SSSG.

5) According to a 'normal' SSSG self-cycle switching, if the first timer expires and 'normal' SSSG is the current SSSG, the wireless communication device 104 or 204 can keep monitoring 'normal' SSSG.

6) According to an 'all SSSs' self-cycle, if a PDCCH is detected before the first timer expires, the wireless communication device 104 or 204 can keep monitoring 'all SSSs'.

Figure 8:
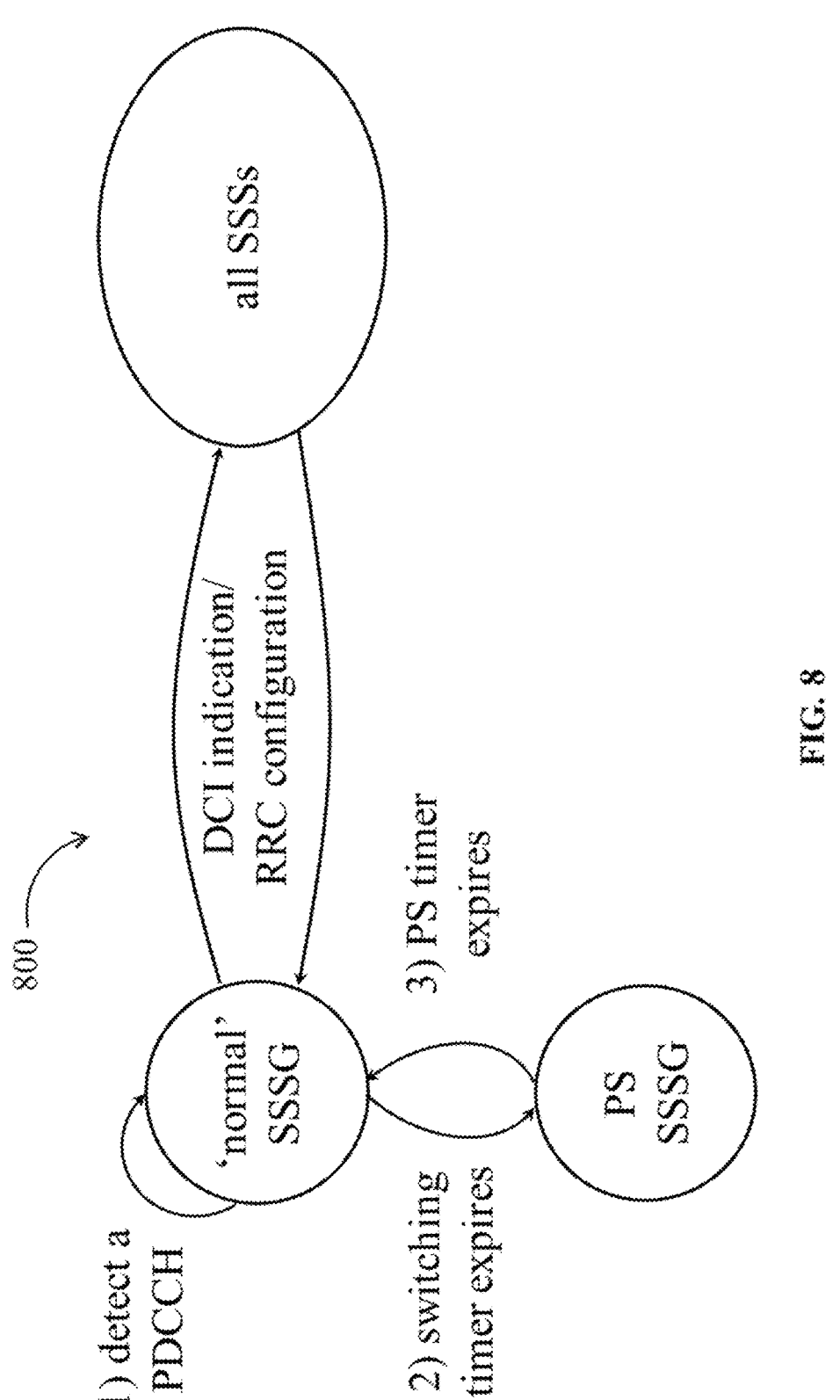
FIG. 8 shows a state diagram illustrating a second example for two SSSGs switching without DCI indication, in accordance with some embodiments of the present disclosure.

Referring to FIG. 8, a state diagram 800 illustrating a second example for two SSSGs switching without DCI indication is shown, in accordance with some embodiments of the present disclosure. The search space switching between all search space sets and normal SSSG can be triggered by DCI. The triggering events associated with FIG. 8 include:

1) If a PDCCH is detected during decrementing a switching timer and 'normal' SSSG is the current SSSG, the wireless communication device 104 or 204 can keep monitoring 'normal' SSSG and resets the switching timer.

2) If the switching timer expires and 'normal' SSSG is the current SSSG, the wireless communication device 104 or 204 can switch to PS SSSG and start the PS timer.

3) If the PS timer expires, the wireless communication device 104 or 204 can switch to 'normal' SSSG.

In some implementations, the candidate values of the PS timer can be a subset of that of the switching timer. The switching timer can be configured one of the {1, . . . , 20} slots for 15 kHz SCS, {1, . . . 40} slots for 30 kHz SCS, {1, . . . , 80} for 60 kHz SCS, and/or {1, . . . , 160} for 120 kHz SCS.

Figure 9:
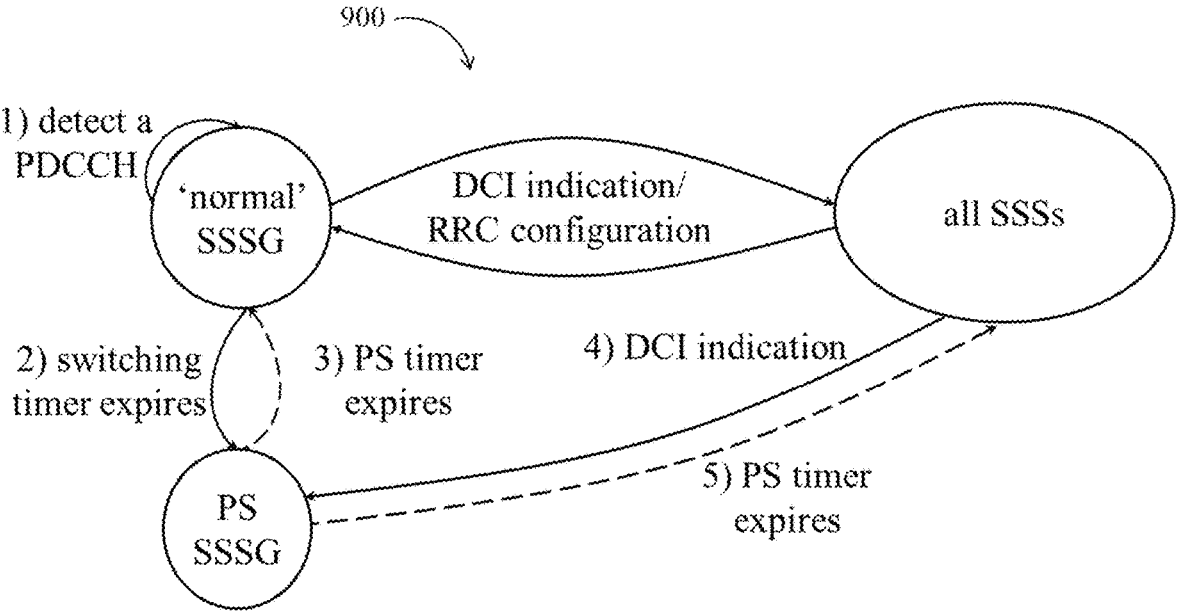
FIG. 9 shows a state diagram illustrating an example for switching between two SSSGs and all search space sets with DCI indication, in accordance with some embodiments of the present disclosure.

Referring to FIG. 9, a state diagram 900 illustrating an example for switching between two SSSGs and all search space sets with DCI indication is shown, in accordance with some embodiments of the present disclosure. After the PS SSSG expires, the wireless communication device 104 or 204 can switch to monitor PDCCH according to 'normal' SSSG or all search space sets based on the RRC configuration. The triggering events associated with FIG. 9 include:

1) If a PDCCH is detected during a switching timer and 'normal' SSSG is the current SSSG, the wireless communication device 104 or 204 can keep monitoring 'normal' SSSG and reset the switching timer.

2) If the switching timer expires and 'normal' SSSG is the current SSSG, the wireless communication device 104 or 204 can switch to PS SSSG and start PS timer.

3) If the PS timer expires, the wireless communication device 104 or 204 can switch to 'normal' SSSG.

4) DCI indicates to the wireless communication device 104 or 204 to switch from all SSSs to PS SSSG.

5) If the PS timer expires, the wireless communication device 104 or 204 can switch to 'normal' SSSG.

Considering the flexibility, a new RRC parameter of default SSSG which is monitored by the wireless communication device 104 or 204 after PS timer expires can be introduced.

1-Bitfield DCI Indication

A 1-bitfield DCI indication can be used to indicate the SSSG switching because self-cycle indication for each SSSG may not be needed for some cases. For example, the 1-bitfield SSSG switching indication can only indicate the SSSG or all search space sets other than the current SSSG monitored by the wireless communication device 104 or 204. For all SSSs, if SSSG switching is disabled by DCI or RRC configuration/reconfiguration, the wireless communication device 104 or 204 can perform PDCCH monitoring according to switching 'normal' SSSG and/or PS SSSG to all SSSs. If SSSG switching is enabled by DCI or RRC configuration/reconfiguration, the wireless communication device 104 or 204 can perform PDCCH monitoring according to switching all SSSs to 'normal' SSSG and/or PS SSSG.

In NR, the wireless communication device 104 or 204 can support a group of cells and perform SSSG switching jointly over these cells. The RRC parameters for SSSG switching, in such case, should be configured/designed to support cell-bundled SSSG switching.

Three SSSGs Including Two Normal SSSGs and One PS SSSG (N3)

The number of search space set groups supported by the wireless communication device 104 or 204 can be 3 in active DL BWP. The three search space set groups can include two normal SSSGs and one PS SSSG. The normal SSSG can include at least one search space set having a Type-3 common search space type and/or UE-specific search space type. The normal SSSG(s) can include a SSSG with a sparse PDCCH monitoring behavior and a SSSG with a dense PDCCH monitoring behavior. The sparse or dense PDCCH monitoring behavior can be determined based on the PDCCH monitoring parameter value of the search space sets in a SSSG.

The PDCCH monitoring periodicity $k_s$ of any search space set in a SSSG with sparse PDCCH monitoring behavior can be larger than the monitoring periodicity $k_s$ of any search space set in a SSSG with dense PDCCH monitoring behavior. The $T_s$ of any search space set in a SSSG with sparse PDCCH monitoring behavior may not be larger than the $T_s$ of any search space set in a SSSG with dense PDCCH monitoring behavior.

In some implementations, a 2-bit field in a DCI can be used to indicate the SSSG switching among the 3 SSSGs and/or the all search space sets configured in the DL BWP. In some implementations, a 1-bit field in a DCI can be used to indicate the SSSG switching from current SSSG to the other 2 SSSGs. For example, the 1-bit field may not be used to indicate to the wireless communication device 104 or 204 not to change the current PDCCH monitoring behavior or to keep monitoring PDCCH according to the current SSSG. For example, if the 1-bit field is set to '0', the current monitored SSSG is SSSG0.

PS Timer for PS SSSG

The wireless communication device 104 or 204 can start a PS timer when the wireless communication device 104 or 204 switches to monitor PDCCH according to the PS SSSG. The wireless communication device 104 or 204 can switch to another SSSG after the PS timer expires. The switching timer may not be larger than the PS timer. The unit of the switching timer and/or PS timer can be a slot or a millisecond.

The network, or the wireless communication node 102 or 202, can configure the same PS timer value for all serving cells in the same CellGroupForSwitch. The PS timer can be configured for a serving cell or for a group of serving cells bundled for SSSG switching. If the wireless communication device 104 or 204 starts monitoring PDCCH according to the PS SSSG, the wireless communication device 104 or 204 can decrement the PS timer value by one after each slot or symbol or millisecond based on a reference SCS configuration. The reference SCS configuration can be the smallest SCS configuration among all configured DL BWPs in the serving cell, or in the set of serving cells. The wireless communication device 104 or 204 can maintain the reference SCS configuration during the PS timer decrement procedure.

The network, or the wireless communication node 102 or 202, can configure the same PS timer value for all BWPs in a serving cell. The PS timer can be configured per serving cell. If the wireless communication device 104 or 204 changes to monitor PDCCH according to the PS SSSG, the wireless communication device 104 or 204 can decrement the PS timer value by one after each slot or symbol or millisecond based on a reference SCS configuration. The reference SCS configuration can be the smallest SCS configuration among all configured DL BWPs in the serving cell. The wireless communication node 102 or 202 can maintain the reference SCS configuration during the PS timer decrement procedure for the serving cell.

The network, or the wireless communication node 102 or 202, can configure the PS timer value for each BWP. The PS timer can be configured per BWP. If the wireless communication device 104 or 204 changes to monitor PDCCH according to the PS SSSG, the wireless communication device 104 or 204 can decrement the PS timer value by one after each slot or symbol or millisecond based on the SCS configuration of the active DL BWP in the serving cell. The wireless communication device 104 or 204 can maintain the SCS configuration of the active DL BWP during the PS timer decrement procedure for the serving cell. If the BWP is switched during the PS timer decrement, the SCS configuration can be changed as the SCS configuration in the active BWP after BWP switching after BWP switching delay.

In some implementations, if the wireless communication device 104 or 204 performs BWP switching to a scheduled BWP switching and the wireless communication device 104 or 204 is indicated a SSSG switching to PS SSSG, the wireless communication device 104 or 204 shall use the PS timer value configured in the scheduled BWP. After PS SSSG expires, the wireless communication device 104 or 204 can switch to a default SSSG. The default SSSG can be configured by RRC parameter or predefined among the normal SSSG(s) and/or all search space sets configured in the DL BWP.

Two SSSGs Including One Normal SSSG and One PS SSSG, and PDCCH Skipping with at Least 1 Skipping Duration Value (N=2, M≥1)

The number of search space set groups supported by the wireless communication device 104 or 204 can be 2 in active DL BWP, and the PDCCH skipping behavior can include at least 2 skipping duration values. The 2 SSSGs can include a normal SSSG and a PS SSSG. The normal SSSG can include at least one search space set having a Type-3 common search space type and/or a UE-specific search space type configured in the active DL BWP. If the PDCCH skipping is performed, the wireless communication device 104 or 204 can stop monitoring PDCCH according to the search space sets having a Type-3 common search space type and/or UE-specific search space type.

In some implementations, after the switching timer expires, the wireless communication device 104 or 204 shall switch PDCCH monitoring according to normal SSSG to PS SSSG, or the wireless communication device 104 or 204 shall switch PDCCH monitoring according to all search space sets to normal SSSG. In some implementations, after the detection of a PDCCH, the wireless communication device 104 or 204 shall switch PDCCH monitoring according to normal SSSG to all search space sets configured in the active DL BWP, or the wireless communication device 104 or 204 shall keep PDCCH monitoring according to normal SSSG or all search space sets configured in the active DL BWP. In some implementations, after the PS timer expires, the wireless communication device 104 or 204 shall switch from normal SSSG to PDCCH skipping behavior.

2-Bitfield DCI Indication

If the PDCCH skipping is not supported by the wireless communication device 104 or 204, 2 bits can be used for a PDCCH monitoring behavior adaptation indication where the leading bit can be set to '0'. Alternatively, 1 bit can be used for the PDCCH monitoring behavior adaptation indication where the only one bit can be used for SSSG switching indication. If the SSSG switching is not supported by the wireless communication device 104 or 204, 2 bits can be used for the PDCCH monitoring behavior adaptation indication and the leading bit can be set to '1'. Alternatively, 1 bit can be used for the PDCCH monitoring behavior adaptation indication and the only one bit can be used for PDCCH skipping indication. If both the PDCCH skipping and SSSG switching are supported by the wireless communication device 104 or 204, 2 bits can be used for the PDCCH monitoring behavior adaptation indication and the leading bit can be used to indicate whether the remaining bit(s) or the second bit is used to indicate the SSSG switching or not.

In some implementations, 2 bits can be used for the PDCCH monitoring behavior adaptation indication. The leading bit can be used to indicate whether the remaining bit(s) or the second bit is used to indicate the SSSG switching or not. If the leading bit is set to '0', the remaining bit(s) or the second bit, when set to '1', is used to indicate the normal SSSG and/or the all search space sets switching to PS SSSG, and the remaining bit(s) or the second bit, when set to '0', is used to indicate the normal SSSG and/or all search space sets switching to the normal SSSG. If the leading bit is set to '1', the remaining bit(s) or the second bit, when set to '0', is used to indicate first PDCCH skipping duration value, and the remaining bit(s) or the second bit, when set to '1', is used to indicate second PDCCH skipping duration value.

Referring to FIGS. 10A-10D, state diagrams 1000, 1010, 1020 and 1030 depicting various scenarios for switching in PDCCH monitoring behavior with DCI indication are shown, in accordance with some embodiments of the present disclosure. In these figures, the normal SSSG is denoted as SSSG0 and PS SSSG is denoted as SSSG1. All SSSs configured in the active DL BWP are involved in the SSSG switching by DCI indication. The state diagrams 1000, 1010, 1020 and 1030 show detailed PDCCH monitoring behavior switching based on a 2-bit field indication.

Figure 10A:
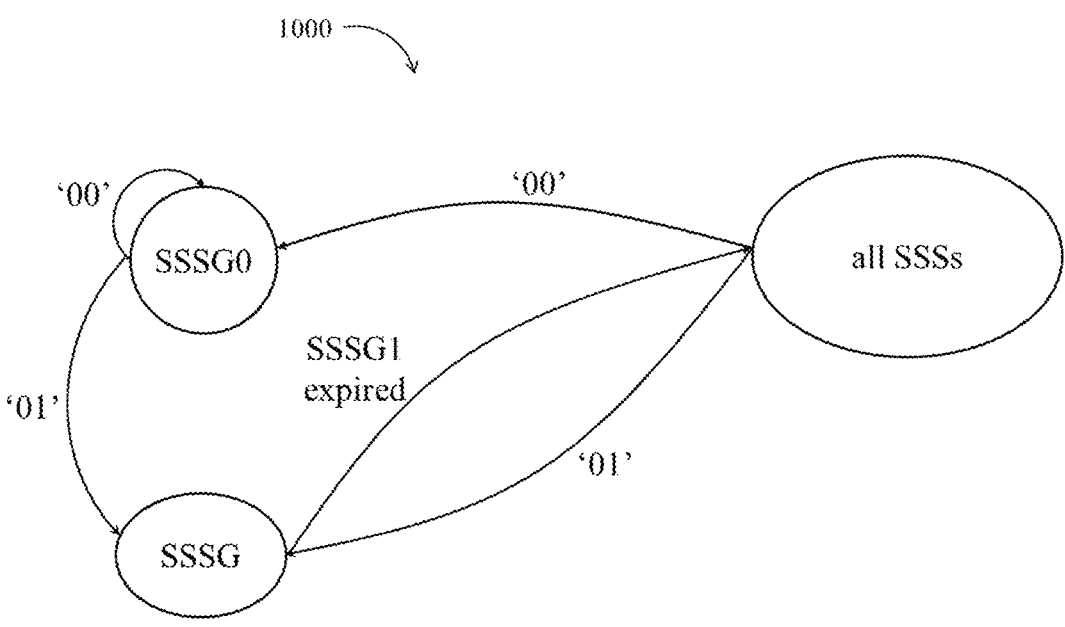
FIGS. 10A-10D show state diagrams depicting various scenarios for switching in PDCCH monitoring behavior with DCI indication, in accordance with some embodiments of the present disclosure.

If wireless communication device 104 or 204 is only provided SSSG switching by higher layer parameters, wireless communication device 104 or 204 can determine the switched SSSG according to the current monitored SSSG and the DCI indication value. Referring to FIG. 10A, the cases of switching to all SSSs after SSSG1 expires are illustrated, and the DCI indication '00' is used to indicate SSSG0 and '01' is used to indicate SSSG1. If the wireless communication device 104 or 204 is monitoring PDCCH according to SSSG0, the DCI indication '00' is used to indicate switching to SSSG0 and DCI indication '01' is used to indicate switching to SSSG1. If the wireless communication device 104 or 204 is monitoring PDCCH according to SSSG1, the wireless communication device 104 or 204 shall switch to monitor PDCCH according to all search space sets in the active DL BWP after SSSG1 expired (e.g., skipping duration ends). If the wireless communication device 104 or 204 is monitoring PDCCH according to all SSSs configured in active DL BWP, the DCI indication '00' is used to indicate switching to SSSG0 and DCI indication '01' is used to indicate switching to SSSG1.

Figure 10B:
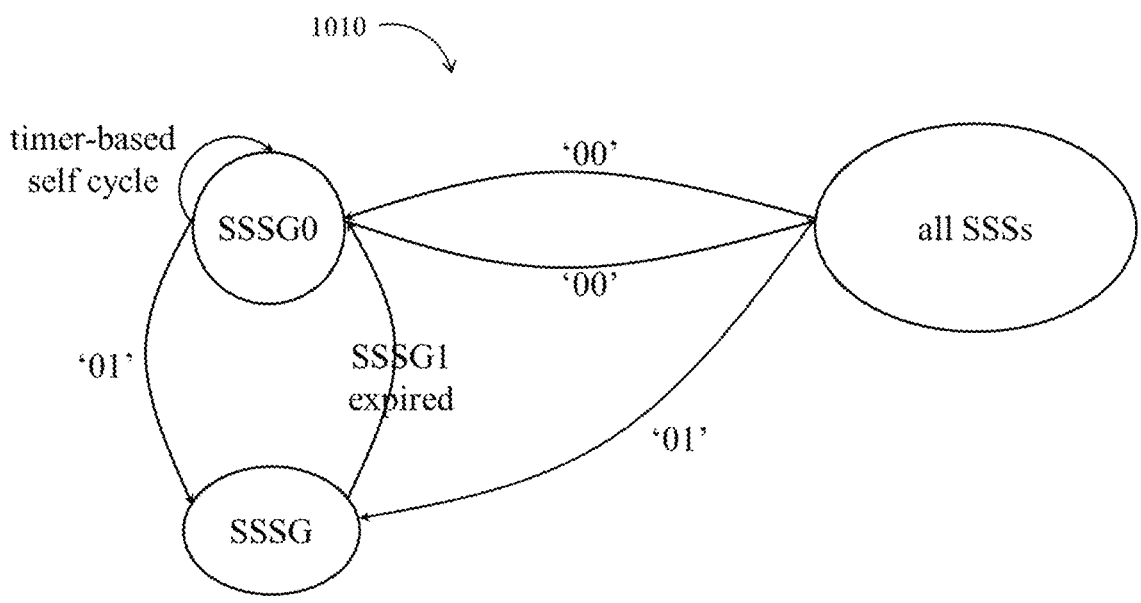

Referring to FIG. 10B, the cases of switching SSSG0 after SSSG1 expires as shown illustrated, and the DCI indication and the current monitored SSSG are both used to determine the switched SSSG. If the wireless communication device 104 or 204 is monitoring PDCCH according to SSSG0, the DCI indication '00' is used to indicate switching to all SSSs and DCI indication '01' is used to indicate switching to SSSG1. If the wireless communication device 104 or 204 is monitoring PDCCH according to SSSG1, the wireless communication device 104 or 204 shall switch to monitor PDCCH according to SSSG0 after SSSG1 expired (e.g., skipping duration ends). If the wireless communication device 104 or 204 is monitoring PDCCH according to all SSSs configured in active DL BWP, the DCI indication '00' is used to indicate switching to SSSG0 and DCI indication '01' is used to indicate switching to SSSG1.

Figure 10C:
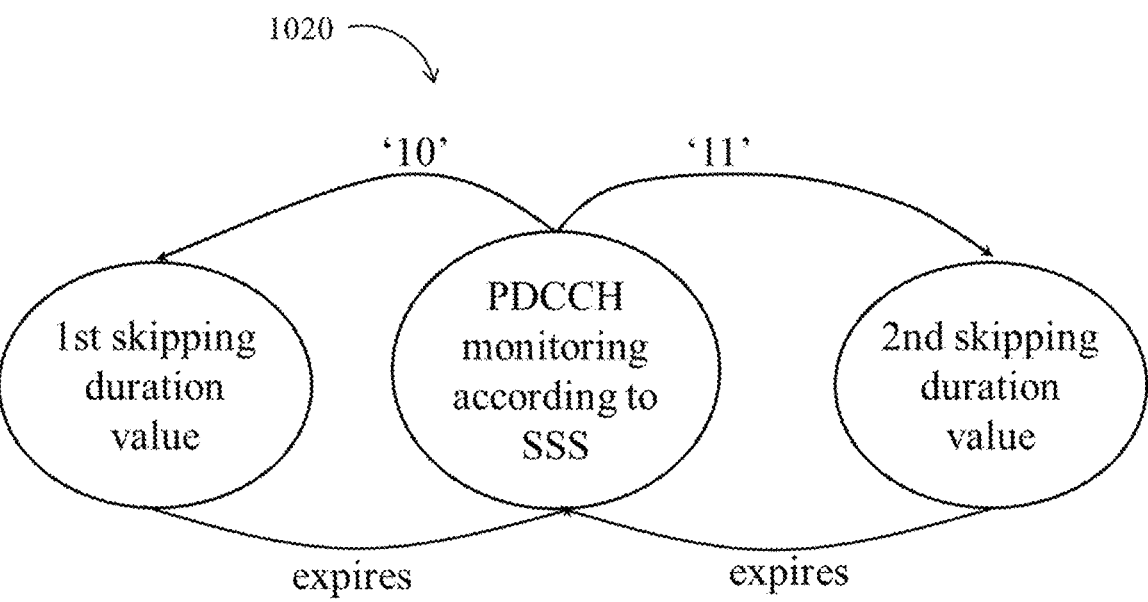

Referring now to FIG. 10C, the state diagram 1020 illustrates a scenario where the wireless communication device 104 or 204 is only provided PDCCH skipping by higher layer parameters. In such scenario, the DCI indication '10' can be used to indicate PDCCH skipping with the first skipping duration value, and the DCI indication '11' can be used to indicate PDCCH skipping with the second skipping duration value. After the PDCCH skipping expires, the wireless communication device 104 or 204 can fall back to monitoring PDCCH according to all SSSs configured in the active DL BWP.

Figure 10D:
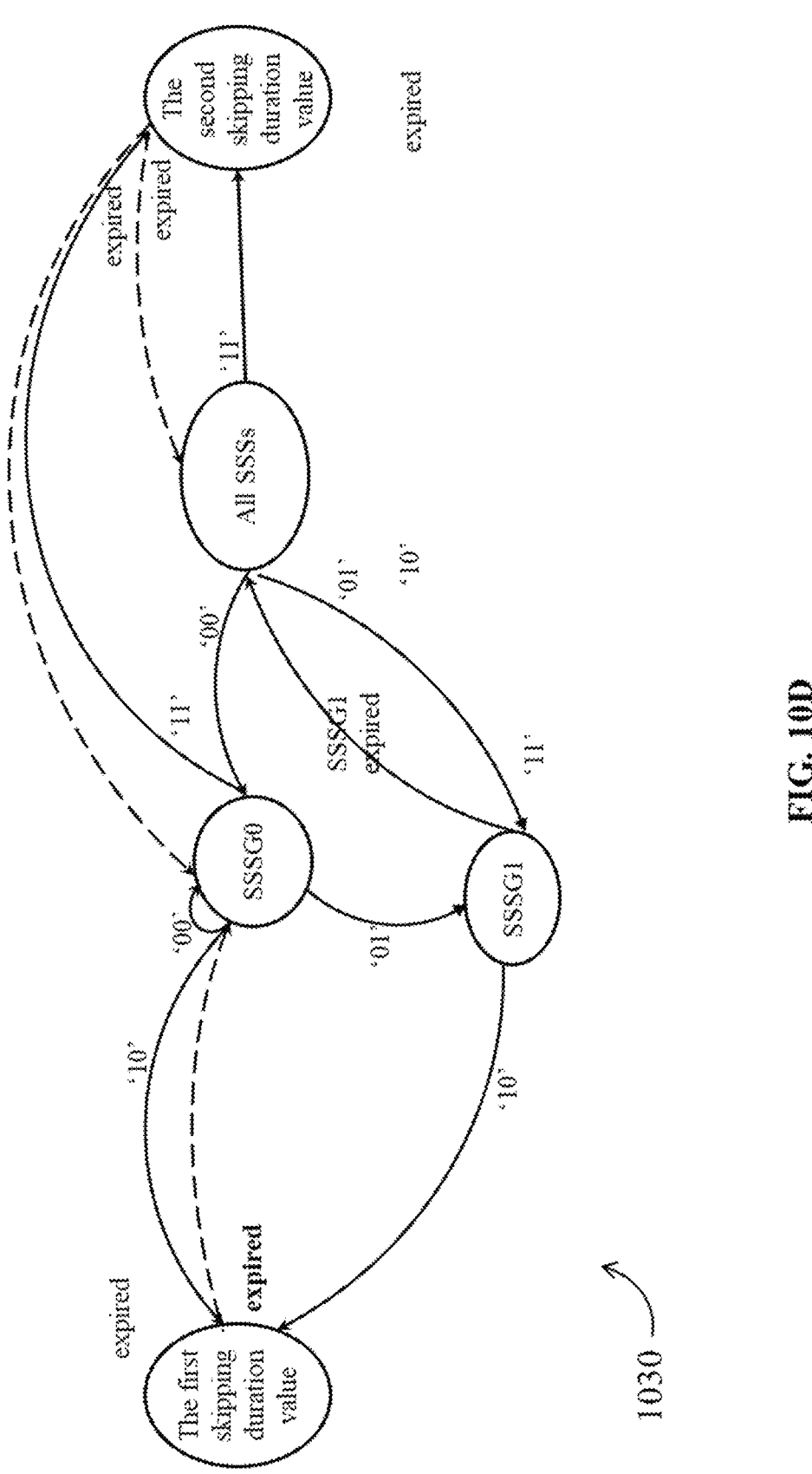

Referring now to FIG. 10D, the state diagram 1030 illustrates a scenario of PDCCH monitoring behavior adaptation by DCI indication where the wireless communication device 104 or 204 is provided both SSSG switching and PDCCH skipping by higher layer parameters. The leading bit of the 2-bit field, when set to '0', can be used to enable the SSSG switching, and the remaining bit(s) or the second bit, when set to '0', can be used to indicate SSSG0 and when set to '1' can be used to indicate SSSG1. The leading bit of the 2-bit field, when set to '1', can be used to enable the PDCCH skipping, and the remaining bit(s) or the second bit, when set to '0', can be used to indicate PDCCH skipping with the first skipping duration value and when set to '1' can be used to indicate PDCCH skipping with the first skipping duration value.

In some implementations, after PDCCH skipping expires (e.g., skipping duration ends), the wireless communication device 104 or 204 can fall back to monitor PDCCH according to a default SSSG. The default SSSG can be configured by RRC signaling selected among SSSG0, SSSG1 and all SSSs.

Two SSSGs Including 2 SSSGs and PDCCH Skipping with at Least 1 Skipping Duration Value (N=2, M≥1)

In some implementations, the number of search space set group supported by the wireless communication device 104 or 204 can be 2 in a DL BWP, and the PDCCH skipping behavior can include at least 2 skipping duration values. The 2 SSSGs can be normal SSSG, which can include at least one search space set having a Type-3 common search space type and/or a UE-specific search space type configured in the active DL BWP. If the PDCCH skipping is performed, the wireless communication device 104 or 204 can stop monitoring PDCCH according to the search space sets having the Type-3 common search space type and/or the UE-specific search space type. The two SSSGs can be assumed to have group IDs 0 and 1, respectively.

Timer-Based Triggering Method

In some implementations, implicit PDCCH monitoring adaptation switching triggering events can include at least one of:

1) Expiration of switching timer can be used for switching SSSG0 to SSSG0, or switching SSSG0 to SSSG1 and/or switching all SSSs to SSSG0.

2) Decoding a PDCCH can be used for switching SSSG0 to SSSG0 or switching SSSG0 to all SSSs;

3) UL activities (SR (scheduling request)/RACH (random access channel)) can be used for switching SSSG0 to all SSSs, or switching SSSG1 to SSSG0 or all SSSs.

4) Additional larger timer can be used for switching SSSG0 to PDCCH Skipping.

2-Bitfield DCI Indication

In some implementations, 1 bit of the 2-bit field can be used to enable/disable PDCCH skipping or enable/disable SSSG switching. The other 1 bit of the 2-bit field can be used to indicate SSSG switch or PDCCH skipping. In some implementations, 2 bits can be used for PDCCH monitoring behavior adaptation indication. The leading bit can be used to indicate whether the remaining bit(s) or the second bit is used to indicate the SSSG switching or PDCCH skipping. If the leading bit is set to '0', the remaining bit(s) or the second bit, when set to '1', can be used to indicate SSSG1, and the remaining bit(s) or the second bit, when set to '0', can be used to indicate SSSG 0. If the leading bit is set to '1', the remaining bit(s) or the second bit, when set to '0', can be used to indicate first PDCCH skipping duration value, and the remaining bit(s) or the second bit, when set to '1', can be used to indicate second PDCCH skipping duration value.

Referring to FIGS. 11A-11D, state diagrams 1100, 1110, 1120 and 1130 depicting other scenarios for switching in PDCCH monitoring behavior with DCI indication are shown, in accordance with some embodiments of the present disclosure. Specifically, there are two SSSGs, which are normal SSSG and are denoted as SSSG0 and SSSG1, and PDCCH skipping is configured with two different skipping duration values. Various scenarios for PDCCH monitoring behavior switching with DCI indication are illustrated in FIGS. 11A-11D.

Figures 11A, 11B:
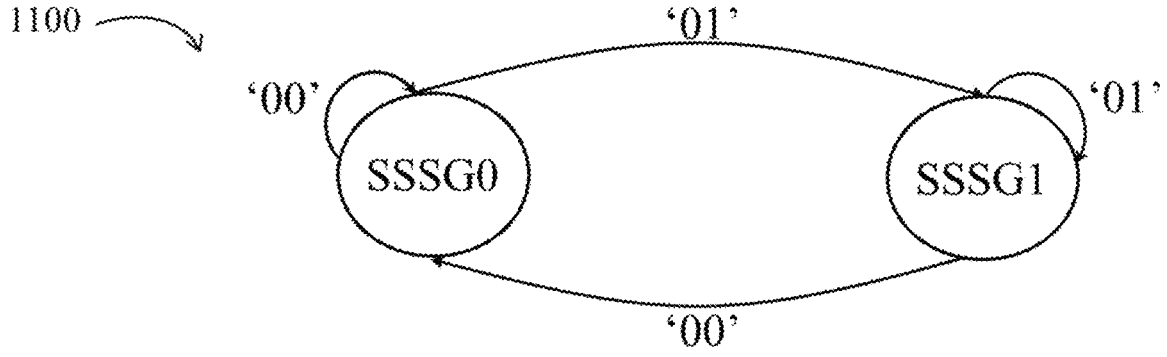

The state diagram 1100 of FIG. 11A depicts the scenario where the wireless communication device 104 or 204 is only provided SSSG switching by higher layer parameters. In this scenario, the DCI indication '00' is used to indicate SSSG0 and DCI indication '01' is used to indicate SSSG1.

The state diagram 1110 of FIG. 11B depicts the scenario where the wireless communication device 104 or 204 is only provided PDCCH skipping by higher layer parameters. The DCI indication '10' can used to indicate PDCCH skipping with the first skipping duration value and DCI indication '11' is used to indicate PDCCH skipping with the second skipping duration value.

When the wireless communication device 104 or 204 is provided both SSSG switching and PDCCH skipping by higher layer parameters, the leading bit of the 2-bit field, when set to '0', can be used to enable the SSSG switching, and the remaining bit(s) or the second bit can be used to indicate SSSG0 when set to '0' and can be used to indicate SSSG1 when set to '1'. The leading bit of the 2-bit field, when set to '1', can be used to enable the PDCCH skipping, and the remaining bit(s) or the second bit can be used to indicate PDCCH skipping with the first skipping duration value when set to '0' and can be used to indicate PDCCH skipping with the first skipping duration value, when set to '1'. The leading bit can be also construed as the most significant bit.

Figures 11C, 11D:
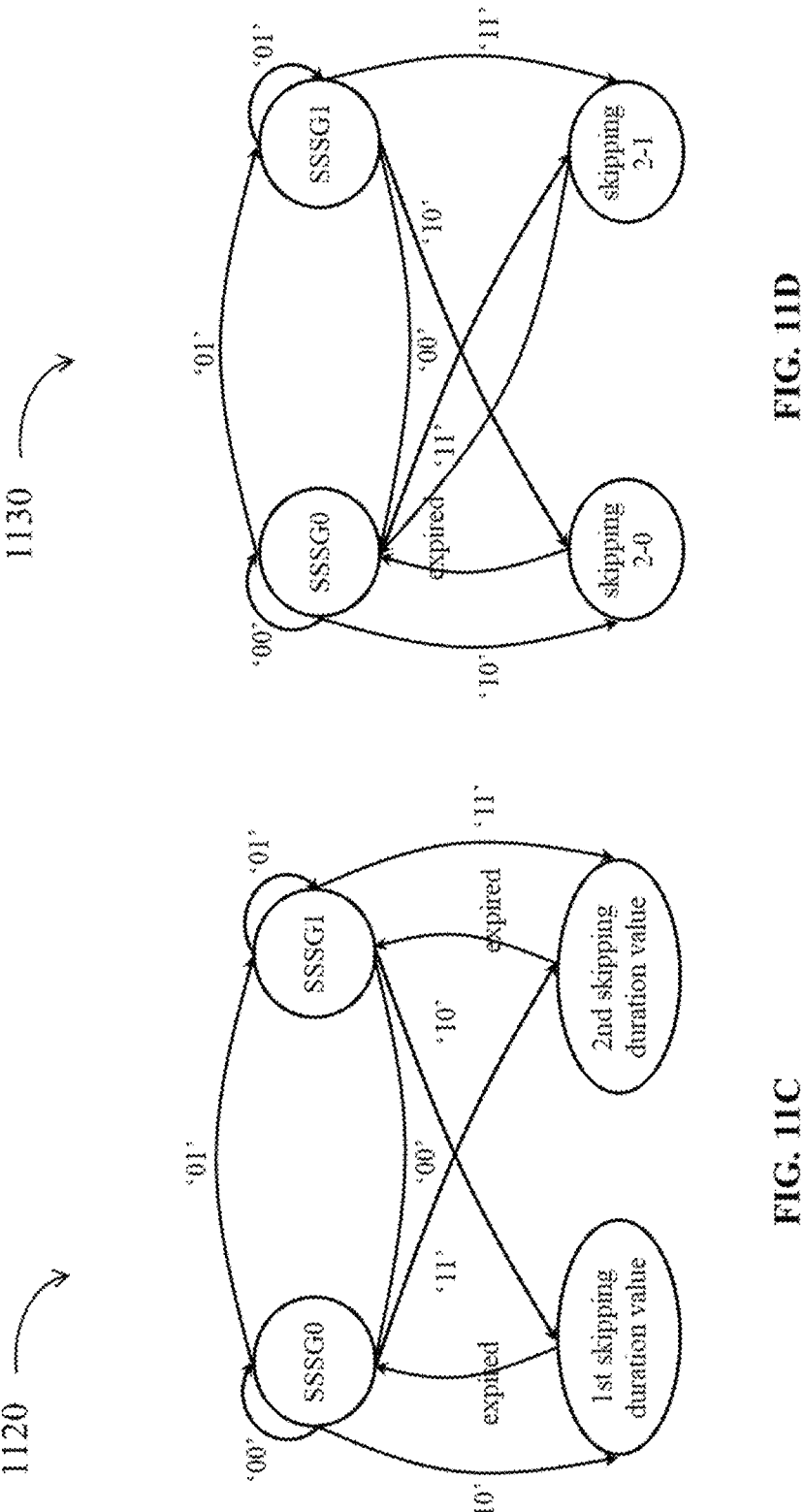

The state diagrams 1120 and 1130 of FIGS. 11C and 11D, respectively, depict scenarios for PDCCH skipping with different skipping duration values. The wireless communication device 104 or 204 can switch or fall back to monitoring PDCCH according to different SSSGs (for skipping with different skipping duration values) or the same default SSSG as shown in FIGS. 11C and 11D, respectively.

Skipping Duration Configuration

In some implementations, the PDCCH skipping duration value can be configured by RRC signaling which is selected from any of the PDCCH monitoring periodicity value(s) configured by higher layer parameter.

When the PDCCH skipping duration ends, the wireless communication device 104 or 204 can start PDCCH monitoring according to a default SSSG. The default SSSG can be configured by a higher layer parameter, which is selected among the SSSG(s) configured for the wireless communication device 104 or 204 and all search space sets configured for the active DL BWP.

To achieve a combination of SSSG monitoring and PDCCH skipping, the skipping duration values can be determined (e.g., by the wireless communication device 104 or 204) by considering the values of PDCCH monitoring periodicity $k_s$ and offset $O_s$, and duration $T_s$ in SearchSpace IE. The list of candidate skipping duration values can be a subset of the values of PDCCH monitoring periodicity $k_s$ in SearchSpace IE.

In some implementations, the list of candidate skipping duration values can be a subset of the values of DRX inactivity timer or the values of DRX onDuration timer in DRX-Config IE.

To achieve a flexible and various PDCCH skipping duration configuration, more accurate PDCCH skipping duration values can be defined. In some implementations, the list of candidate PDCCH skipping duration value can be equal to 0*2n, where a is an integer that is not smaller than 1 and not larger than 5. The parameter n is an integer that is not smaller than 0 and not larger than 10. The unit of the PDCCH skipping duration can be slot or millisecond.

To make the PDCCH skipping duration suitable for various SCS configurations, it is desirable to define the difference between each two adjacent candidate PDCCH skipping duration values. In some implementations, the difference between a pair of adjacent candidate PDCCH skipping duration values is not smaller than 0.125 millisecond, or 0.25 millisecond, or 0.5 millisecond, or 1 millisecond or 1 slot or 1 symbol.

In some embodiments, the PDCCH skipping duration is decremented by one after each slot or symbol or millisecond according to a reference SCS. In some embodiments, the reference SCS is the smallest reference SCS configuration p across all BWPs in a cell or a set of cells if the PDCCH skipping duration is bundled for a set of cells. In some embodiments, the reference SCS is maintained during the running of PDCCH skipping duration.

SSSG Configuration

In some implementations, SSSG switching only used for switching search space sets belonging to type-3 common search space sets and UE-specific search space sets. The above mentioned 'all search space sets configured in active DL BWP' refers to all of search space sets that belong to type-3 common search space sets and/or UE-specific search space sets, and are configured in the active DL BWP.

Application Delay

The application delay for PDCCH monitoring behavior switching should consider the processing time for DL semi-persistent scheduling (SPS) release, the processing preparation time for PUSCH and the worst case carrier aggregation (CA) to avoid being too late to process the data transmission. The wireless communication device 104 or 204 can be expected to provide HARQ-ACK information in response to a SPS PDSCH release after X symbols from the last symbol of a PDCCH providing the SPS PDSCH release. If processingType2Enabled of PDSCH-ServingCellConfig is set to enable for the serving cell with the PDCCH providing the SPS PDSCH release, X=5 for $\mu$=0, X=5.5 for $\mu$=1, and X=11 for $\mu$=2, otherwise, X=10 for $\mu$=0, X=12 for $\mu$=1, X=22 for $\mu$=2, and X=25 for $\mu$=3. The PUSCH preparation time for the wireless communication device 104 or 204 can be 10/12/23/36 symbols for $\mu$=15/30/60/120 kHz or 5/5.5/11 symbols for $\mu$=15/30/60 kHz. The worst case CA is 25 symbols. If the DCI format 1_1 indicating SSSG switching or PDCCH skipping is also indicating SCell dormancy, the wireless communication device 104 or 204 is expected to provide HARQ-ACK information in response to a detection of a DCI format 1_1 indicating SCell dormancy after N symbols from the last symbol of a PDCCH providing the DCI format 1_1. If processingType2Enabled of PDSCH-ServingCellConfig is set to enable for the serving cell with the PDCCH providing the DCI format 1_1, N=7 for $\mu$=0, N=7.5 for $\mu$=1, and N=15 for $\mu$=2; otherwise, N=14 for $\mu$=0, N=16 for $\mu$=1, N=27 for $\mu$=2, and N=31 for $\mu$=3, where p is the smallest SCS configuration between the SCS configuration of the PDCCH providing the DCI format 1_1 and the SCS configuration of a PUCCH with the HARQ-ACK information in response to the detection of the DCI format 1_1.

Therefore, according to the above mentioned cases, the minimum delay for applying PDCCH skipping or SSSG switching may be determined based on at least one of the following values by considering these cases.

Considering the time interval of HARQ-ACK information in response to a detection of a DCI format 1_1 indicating SCell dormancy, the wireless communication device 104 or 204 should perform PDCCH skipping or SSSG switching after reporting HARQ-ACK information. In some implementations, the minimum delay for PDCCH monitoring behavior switching among SSSGs switching or PDCCH skipping can be 7/7.5/15 symbols for $\mu$=0/1/2 or 14/16/27/31 symbols for $\mu$=0/1/2/3. In some implementations, if processingType2Enabled of PDSCH-ServingCellConfig is set to enable for the serving cell with the PDCCH providing the DCI format 1_1, the minimum delay may not be less than 7/7.5/15 symbols for $\mu$=0/1/2, otherwise, the minimum delay is not less than 14/16/27/31 symbols for $\mu$=0/1/2/3.

Considering the PUSCH preparation time, the 36 symbols can be defined as a threshold for the minimum delay for PDCCH monitoring behavior switching. In some implementations, the minimum delay for PDCCH monitoring behavior switching among SSSGs switching or PDCCH skipping for frequency range 2 (FR2) can be D, where D is not larger than 36 symbols for μ=3. For example, D can be 24, 25, 27, 31 or 36 symbols for μ=3.

Considering the PUSCH preparation time, the 36 symbols can be defined as a minimum value for the minimum delay for PDCCH monitoring behavior switching. In some implementations, the minimum delay for PDCCH monitoring behavior switching among SSSGs switching or PDCCH skipping for frequency range 2 (FR2) can be D, where D is not smaller than 36 symbols for μ=3. For example, D can be 36 or 40 symbols for μ=3.

Considering the PDCCH monitoring behavior switching is performed in active DL BWP, the DL SPS processing time and worst case CA are used to determine the minimum delay value for the wireless communication device 104 or 204 processing capability for PDCCH monitoring behavior switching among PDCCH skipping or SSSGs.

In some implementations, the minimum delay for PDCCH monitoring behavior switching among SSSGs switching or PDCCH skipping for frequency range 2 (FR2) can be D, where D is not larger than 36 symbols for μ=3. For example, D can be equal to 24, 25 or 36 symbols for μ=3. In some implementations s, the application delay for PDCCH monitoring behavior switching between SSSG monitoring and PDCCH skipping can be as provided in Table 1 below.

TABLE 1

| μ | Minimum delay value for UE processing capability 1 [symbols] | Minimum delay value for UE processing capability 2 [symbols] |
|---|---|---|
| 0 | 25 | 10 |
| 1 | 25 | 12 |
| 2 | 25 | 22 |
| 3 | 25 | 25 |

In some implementations, the application delay for PDCCH monitoring behavior switching between different SSSGs can be as provided in Table 2 below.

TABLE 2

| μ | Minimum delay value for UE processing capability 1 [symbols] | Minimum delay value for UE processing capability 2 [symbols] |
|---|---|---|
| 0 | 25 | 10 |
| 1 | 25 | 12 |
| 2 | 25 | 22 |
| 3 | 25 | 25 |

In some implementations, the minimum delay for PDCCH monitoring behavior switching among SSSGs switching or PDCCH skipping can be at least one of the 25 symbols for μ=0/1/2/3 or 10/12/22/25 symbols for μ=0/1/2/3.

Embodiment 2: New Transmission/Retransmission Processing

Solutions to the impact of data processing on PDCCH monitoring according to PS SSSG or PDCCH skipping or a sparser SSSG can include:

(1) When the wireless communication device 104 or 204 switches to a sparser SSSG or PDCCH skipping, the wireless communication device 104 or 204 does not expect to detect PDCCH scheduling in an initial transmission or the wireless communication device 104 or 204 shall start monitoring PDCCH according to the sparser SSSG or PDCCH skipping after a specific duration.

i The specific duration can be configured by radio resource control (RRC) signaling; or ii The specific duration can be determined by bandwidth part (BWP) switching delay; or iii The specific duration can start after the slot or symbol or a valid PDCCH monitoring occasion at which the wireless communication device 104 or 204 receives the DCI indication or switching timer expires, and can end after the slot or symbol or a valid PDCCH monitoring occasion at which all DL scheduled data are received successfully.

iv The specific duration can start after the slot or symbol or a valid PDCCH monitoring occasion at which the wireless communication device 104 or 204 receives the DCI indication or switching timer expires, and can end after the slot or symbol or a valid PDCCH monitoring occasion at which the most recent scheduled data completely received by using the maximum number of retransmission.

v The specific duration can end after the earliest slot between the slot at which the most recent scheduled data is completely received by using the maximum number of retransmission and the slot at which all scheduled DL data are received successfully.

vi Herein, the described 'all scheduled data are received successfully' can be construed as 'all PDSCH HARQ processes are completed or ended in the serving cell or across the related CCs bundled for SSSG switching or PDCCH skipping' or 'all PDSCH and PUSCH are processed completely in the serving cell or across the related CCs bundled for SSSG switching or PDCCH skipping'.

(2) When DRX is configured and the wireless communication device 104 or 204 is monitoring PDCCH according to sparser SSSG or PDCCH skipping, the wireless communication device 104 or 204 shall start monitoring PDCCH according to a default SSSG during the duration that the DRX-Retransmission timer DL/UL is running.

(3) When DRX is configured or the wireless communication device 104 or 204 is monitoring PDCCH according to PDCCH skipping or the sparser SSSG, the wireless communication device 104 or 204 shall stop skipping duration or stop monitoring PDCCH according to the sparser SSSG, and start monitoring PDCCH according to a default SSSG after wireless communication device 104 or 204 transmits SR on PUCCH and SR is pending, or after the wireless communication device 104 or 204 receives RAR successfully for the Random Access Preamble not selected by the MAC entity among the contention-based Random Access Preamble.

(4) When DRX is configured or the wireless communication device 104 or 204 is monitoring PDCCH according to the SSSG with a sparse PDCCH monitoring behavior or PDCCH skipping, the wireless communication device 104 or 204 shall stop skipping duration or stop monitoring PDCCH according to the sparser SSSG, and start monitoring PDCCH according to a default SSSG at a first slot or symbol or a valid PDCCH monitoring occasion that is at least the delay symbols after the last symbol of the SR on PUCCH and SR is pending, or after the last symbol of the RAR or PDCCH with the CRC scrambled by RA-RNTI for the Random Access Preamble not selected by the MAC entity among the contention-based Random Access Preamble.

(5) In some implementations, the wireless communication device 104 or 204 shall stop performing PDCCH skipping or stop monitoring PDCCH according to the sparser SSSG, and start monitoring PDCCH according to a default SSSG when the wireless communication device 104 or 204 meets at least one of the following events:

i beam failure detection;

ii the wireless communication device 104 or 204 needs to indicate out-of-sync status to higher layers;

iii the wireless communication device 104 or 204 has no PUCCH resource to send SR;

iv the wireless communication device 104 or 204 uses RACH resource to send SR;

v PDCCH monitoring after the wireless communication device 104 or 204 monitors a search space set provided by recoverySearchSpaceId;

vi the wireless communication device 104 or 204 is out-of-sync when the wireless communication device 104 or 204 needs to report HARQ-ACK feedback information;

vii the wireless communication device 104 or 204 is out-of-sync when the wireless communication device 104 or 204 needs to send PUSCH.

(6) Wherein the sparser SSSG is a group of search space sets with less PDCCH monitoring occasions. Wherein the default SSSG is configured by RRC parameter or predefined among the normal SSSG(s) and/or the regular SSSG.

Retransmission Cases for PDCCH Monitoring According to SSSG or PDCCH Skipping

In some implementations, when the wireless communication device 104 or 204 switches PDCCH monitoring according to a SSSG with a dense PDCCH monitoring behavior to a SSSG with a sparse PDCCH monitoring behavior, the wireless communication device 104 or 204 shall start monitoring PDCCH according to the SSSG with a sparse PDCCH monitoring behavior after a specific duration. When the wireless communication device 104 or 204 switches PDCCH monitoring to PDCCH skipping, the wireless communication device 104 or 204 shall start PDCCH skipping after a specific duration.

The specific duration can start after the slot or symbol or a valid PDCCH monitoring occasion in which the wireless communication device 104 or 204 receives the DCI indication or the switching timer expires, and can end after the slot or symbol or a valid PDCCH monitoring occasion at which all DL scheduled data are received successfully. The specific duration can start after the slot or symbol or a valid PDCCH monitoring occasion in which the wireless communication device 104 or 204 receives the DCI indication or switching timer expires, and can end after the slot or symbol or a valid PDCCH monitoring occasion at which the most recent scheduled data is completely received by using the maximum number of retransmission. The specific duration can end after the earliest slot between the slot at which the most recent scheduled data is completely received by using the maximum number of retransmission and the slot at which all scheduled DL data are received successfully.

In some implementations, when DRX is configured and the wireless communication device 104 or 204 is monitoring PDCCH according to the SSSG with a sparse PDCCH monitoring behavior or PDCCH skipping, the wireless communication device 104 or 204 shall start monitoring PDCCH according to a SSSG with dense PDCCH monitoring behavior or all search space sets configured in the active DL BWP during the duration that the DRX-Retransmission timer DL/UL is running.

Herein, the expressions 'all DL scheduled data are received successfully' or 'all scheduled data are received successfully' can be construed as 'all PDSCH HARQ processes are completed or ended in the serving cell or across the related CCs bundled for SSSG switching or PDCCH skipping' or 'all PDSCH and configured UL grant are processed completely in the serving cell or across the related CCs bundled for SSSG switching or PDCCH skipping'.

New Transmission Cases for PDCCH Monitoring According to SSSG or PDCCH Skipping

In some implementations, when the wireless communication device 104 or 204 is monitoring PDCCH according to the SSSG with a sparse PDCCH monitoring behavior or PDCCH skipping, the wireless communication device 104 or 204 does not expect to detect PDCCH scheduling a initial transmission.

UL transmission cases for PDCCH monitoring according to SSSG or PDCCH skipping

Figure 12B:
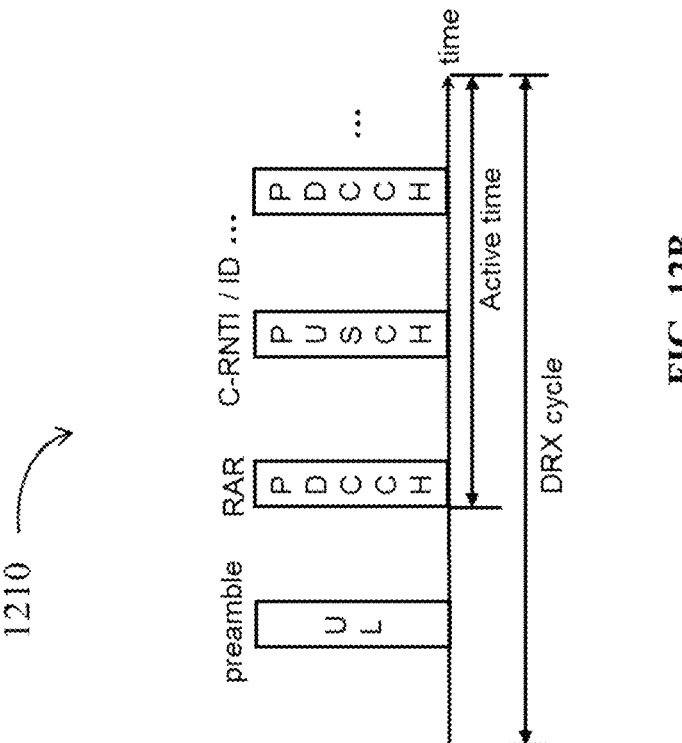
FIGS. 12A and 12B show two diagrams illustrating two events triggering DRX active time, in accordance with some embodiments of the present disclosure.
Figure 12A:
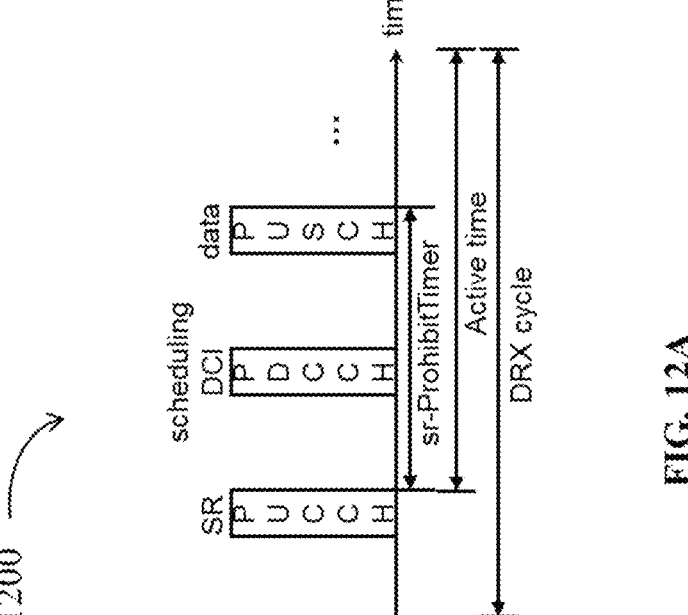

Referring to FIGS. 12A and 12B two diagrams 1200 and 1210 illustrating two events triggering DRX active time are shown, in accordance with some embodiments of the present disclosure. When a DRX cycle is configured, the Active Time for Serving Cells in a DRX group can include the time while:

1) drx-onDurationTimer or drx-InactivityTimer configured for the DRX group is running, or 2) drx-RetransmissionTimerDL or drx-RetransmissionTimerUL is running on any Serving Cell in the DRX group, or 3) ra-ContentionResolutionTimer or msgB-ResponseWindow is running, or 4) a scheduling request (SR) is sent on PUCCH and is pending as shown in FIG. 12A, or 5) a PDCCH indicating a new transmission addressed to the C-RNTI of the MAC entity has not been received after successful reception of a Random Access Response for the Random Access Preamble not selected by the MAC entity among the contention-based Random Access Preamble as shown in FIG. 12B.

According to the above descriptions, for the wireless communication device 104 or 204 supporting SSSG switching and/or PDCCH skipping, it is important to consider whether and how to minimize the impact to data scheduling for new transmissions and retransmissions.

In some implementations, whether the wireless communication device 104 or 204 shall switch to or shall not switch to a default SSSG can be configured by a radio resource control (RRC) signaling parameter.

In some implementations, if PDCCH skipping is performed by the wireless communication device 104 or 204, the wireless communication device 104 or 204 shall stop skipping duration and start monitoring PDCCH according to a denser SSSG or all search space sets configured in the current active DL BWP after the wireless communication device 104 or 204 transmits SR on PUCCH and SR is pending, or after the wireless communication device 104 or 204 receives RAR successfully for the Random Access Preamble not selected by the MAC entity among the contention-based Random Access Preamble.

If the wireless communication device 104 or 204 monitors PDCCH according to the sparser SSSG, the wireless communication device 104 or 204 shall stop monitoring PDCCH according to the sparser SSSG and start monitoring PDCCH according to a denser SSSG or all search space sets configured in the current active DL BWP after the wireless communication device 104 or 204 transmits SR on PUCCH and SR is pending, or after wireless communication device 104 or 204 receives RAR successfully for the Random Access Preamble not selected by the MAC entity among the contention-based Random Access Preamble, or after the Active Time is activated by the above events except for the running of drx-onDurationTimer or drx-InactivityTimer configured for the DRX group.

In some implementations, if PDCCH skipping is performed by the wireless communication device 104 or 204, the wireless communication device 104 or 204 shall stop skipping duration and start monitoring PDCCH according to a denser SSSG or all search space sets configured in the current active DL BWP at a first slot or symbol or a valid PDCCH monitoring occasion that is at least application delay symbols after the last symbol of the SR on PUCCH and SR is pending, or after the last symbol of the RAR or PDCCH with the CRC scrambled by RA-RNTI for the Random Access Preamble not selected by the MAC entity among the contention-based Random Access Preamble, or after the Active Time is activated by the above events except for the running of drx-onDurationTimer or drx-Inactivity-Timer configured for the DRX group or PDCCH monitoring after the wireless communication device 104 or 204 monitors a search space set provided by recoverySearchSpaceId when the wireless communication device 104 or 204 is performing or before start performing PDCCH skipping or is performing or before start performing a sparse SSSG monitoring.

In some implementations, if the wireless communication device 104 or 204 monitors PDCCH according to the sparser SSSG, the wireless communication device 104 or 204 shall stop monitoring PDCCH according to the sparser SSSG and start monitoring PDCCH according to a denser SSSG or all search space sets configured in the current active DL BWP at a first slot or symbol or a valid PDCCH monitoring occasion that is at least application delay symbols after the last symbol of the SR on PUCCH and SR is pending, or after the last symbol of the RAR or PDCCH with the CRC scrambled by RA-RNTI for the Random Access Preamble not selected by the MAC entity among the contention-based Random Access Preamble.

In some implementations, a sparser SSSG can be the SSSG0 in NR-U or a SSSG with a sparse PDCCH monitoring behavior or with fewer PDCCH monitoring occasions or with a fewer number of search space sets or default SSSG or PS SSSG. In some implementations, a denser SSSG can be the SSSG1 in NR-U or a SSSG with a dense PDCCH monitoring behavior or with more PDCCH monitoring occasions or with more search space sets or all SSSs configured in the BWP or the denser SSSG among SSSGs configured in the BWP.

Embodiment 3: UE Capability Parameters

As described in STEP 602 of FIG. 6, the wireless communication device 104 or 204 can reports a plurality of UE capability parameters related to SSSG switching and/or PDCCH skipping. The plurality of UE capability parameters can include at least one of:

(1) searchSpaceSetGroupSwitchingwithDCI-r17: Indicates whether the wireless communication device 104 or 204 supports switching among N groups of search space sets with DCI 0_1 or DCI 1_1 or DCI 0_2 or DCI 1_2 monitoring.

(2) searchSpaceSetGroupSwitchingwithoutDCI-r17: Indicates whether the wireless communication device 104 or 204 supports switching among N groups of search space sets without DCI 0_1 or DCI 1_1 or DCI 0_2 or DCI 1_2 monitoring.

(3) pdcchSkippingwithDCI-r17: Indicates whether the wireless communication device 104 or 204 supports stopping monitoring PDCCH or PDCCH skipping with DCI 0_1 or DCI 1_1 or DCI 0_2 or DCI 1_2 monitoring.

(4) pdcchSkippingwithoutDCI-r17: Indicates whether the wireless communication device 104 or 204 supports stopping monitoring PDCCH or PDCCH skipping without DCI 0_1 or DCI 1_1 or DCI 0_2 or DCI 1_2 monitoring.

(5) pdcchSkippingcapability2-r17: Indicates whether the wireless communication device 104 or 204 supports the minimum delay for switching among SSSGs switching or PDCCH skipping: P symbols. In some implementations, P can be an integer that is equal to 10/12/22/25 symbols for $\mu$=0/1/2/3 SCS.

In some implementations, If the wireless communication device 104 or 204 supports this feature, the wireless communication device 104 or 204 needs to report searchSpaceSetGroupSwitchingwithDCI-r17 or searchSpaceSetGroupSwitchingwithoutDCI-r17 or pdcchSkippingwithDCI-r17 or pdcchSkippingwithoutDCI-r17 or pdcchMonitoringAdaptationwithDCI-r17 or pdcchMonitoringAdaptationwithoutDCI-r17.

(6) jointPdcchSkippingAcrossCells-r17: Indicates whether the wireless communication device 104 or 204 supports being configured with a group of cells and PDCCH skipping jointly over these cells. If the wireless communication device 104 or 204 supports this feature, the wireless communication device 104 or 204 needs to report pdcchSkippingwithDCI-r17 or pdcchSkippingwithoutDCI-r17.

(7) pdcchMonitoringAdaptationwithDCI-r17: (configured per band) Indicates whether the wireless communication device 104 or 204 supports switching among N groups of search space sets and PDCCH skipping of M different skipping duration values with DCI 0_1 or DCI 1_1 or DCI 0_2 or DCI 1_2 monitoring.

(8) pdcchMonitoringAdaptationwithoutDCI-r17: (configured per band) Indicates whether the wireless communication device 104 or 204 supports switching among N groups of search space sets and PDCCH skipping of M different skipping duration values without DCI 0_1 or DCI 1_1 or DCI 0_2 or DCI 1_2 monitoring.

(9) dataProcessingforpdcchSkipping-r17: Indicates whether the wireless communication device 104 or 204 supports monitoring PDCCH scheduling retransmission data, or PDCCH scheduling a PUSCH corresponding to a scheduling request (SR) on a physical uplink control channel (PUCCH) with pending state, or PDCCH monitoring after the wireless communication device 104 or 204 receives a random access response (RAR) successfully for a random access preamble that is not selected by a medium access control (MAC) entity among contention-based random access preambles, or PDCCH during an Active Time which is activated by events except for running of drx-onDurationTimer or drx-InactivityTimer, or PDCCH monitoring after the wireless communication device monitors a search space set provided by recoverySearchSpaceId when the wireless communication device is performing or before start performing PDCCH skipping or is performing or before start performing a sparse SSSG monitoring If the wireless communication device 104 or 204 supports this feature, the wireless communication device 104 or 204 needs to report pdcchSkippingwithDCI-r17 or pdcchSkippingwithoutDCI-r17 or pdcchMonitoringAdaptationwithDCI-r17 or pdcchMonitoringAdaptationwithoutDCI-r17.

In some implementations, the wireless communication device 104 or 204 ignores PDCCH skipping when the UE meets at least one of the above events.

In some implementations, the wireless communication device 104 or 204 applies PDCCH skipping after all data received successfully.

(10) dataProcessingforsearchSpaceSwitching-r17:

Indicates whether the UE supports monitoring PDCCH scheduling retransmission data and applying search space set group switching after all data received successfully. If the UE supports this feature, the UE needs to report searchSpaceSwitchingwithDCI-r17 or searchSpaceSwitchingwithoutDCI-r17.

(11) psSearchSpaceGroupMornitoring-r17:

Indicates whether the UE supports monitoring PDCCH according to a power saving search space set group.

(12) SearchSpaceGroup-r17:

Indicates whether the UE supports search space set group switching between two groups of search space sets or N1 groups of search space sets. Wherein N1 is an integer that is larger than 2.

(13) Numberofsearchspacegroup-r17, which indicates a number of search space set group supported by the wireless communication device 104 or 204.

(14) Numberofsearchspacegroup-r17, which indicates a number of skipping duration supported by the wireless communication device 104 or 204.

(15) pdcchMonitoringSwitchingCapability-r17:

Indicates whether the UE supports the minimum delay for SSSG switching or PDCCH skipping as 25 symbols for $\mu=3$.

The plurality of UE capability parameters may be configured per band or may be configured for frequency band 2 (FR2) only.

The detailed functions of each UE capability parameter can be as followings.

1. searchSpaceSetGroupSwitchingwithDCI-r17 (configured per band):

Indicates whether the wireless communication device 104 or 204 supports switching among N groups of search space sets with DCI 0_1 or DCI 1_1 or DCI 0_2 or DCI 1_2 monitoring that comprises the following functional components:

For example, N=3 and the three SSSGs include group 0, group 1 and a PS SSSG.

Monitor DCI 0_1 or DCI 1_1 or DCI 0_2 or DCI 1_2 with a search space set switching field;

Support switching the search space set group with PDCCH decoding in group 1 or a group with dense PDCCH monitoring behavior or in all Type3-PDCCH CSS sets and/or USS sets configured in active DL BWP;

Support switching the search space set group with DRX-RetransmissionTimer DL/UL running in group 1 or a group with dense PDCCH monitoring behavior or in all Type3-PDCCH CSS sets and/or USS sets configured in active DL BWP;

Support switching the search space set group with SR transmission on PUCCH with pending state in group 1 or a group with dense PDCCH monitoring behavior or in all Type3-PDCCH CSS sets and/or USS sets configured in active DL BWP;

Support switching the search space set group with RAR receiving or PDCCH decoding with the CRC scrambled by RA-RNTI for the Random Access Preamble not selected by MAC entity among the contention-based Random Access Preamble in group 1 or a group with dense PDCCH monitoring behavior or in all Type3-PDCCH CSS sets and/or USS sets configured in active DL BWP;

Support a PS timer to switch back to original search space set group or default search space set group;

Support a skipping duration to switch back to original search space set group or default search space set group;

Support a switching timer to switch back to original search space set group if only 2 SSSGs are supported by the UE, or PS SSSG;

Support a DRX-RetransmissionTimer DL/UL to switch back to original search space set group or PS SSSG.

Support HARQ-ACK report for the most recent DL data to switch back to a PS SSSG.

The wireless communication device 104 or 204 can switch search space set groups for different cells independently, unless the wireless communication device 104 or 204 supports jointSearchSpaceGroupSwitchingAcrossCells-r16. The wireless communication device 104 or 204 can support search space set group switching capability-1: P, unless the wireless communication device 104 or 204 supports jointSearchSpaceGroupSwitchingAcrossCells-r16. In some implementations, P=25/25/25/25 symbols for $\mu=0/1/2/3$.

Note that the default search space set group is configured by a higher layer parameter, or selected from the group 0, group 1 and all Type3-PDCCH CSS sets and/or USS sets configured in active DL BWP. Also note that the original search space set group is PS SSSG or group 0.

2. searchSpaceSetGroupSwitchingwithoutDCI-r17: (Configured Per Band)

Indicates whether the wireless communication device 104 or 204 supports switching among N groups of search space sets without DCI 0_1 or DCI 1_1 or DCI 0_2 or DCI 1_2 monitoring (e.g., (i) implicit PDCCH decoding, DRX-RetransmissionTimer DL/UL running, (ii) SR transmission on PUCCH with pending state, (iii) RAR receiving or PDCCH decoding with the CRC scrambled by RA-RNTI for the Random Access Preamble not selected by MAC entity among the contention-based Random Access Preamble, (iv) PS timer, (v) the end of PDCCH skipping, HARQ-ACK report) that comprises of the following functional components: For example, N=3 and the three SSSGs include group 0, group 1 and a PS SSSG.

Support switching the search space set group with PDCCH decoding in group 1 or a group with dense PDCCH monitoring behavior or in all Type3-PDCCH CSS sets and/or USS sets configured in active DL BWP.

Support switching the search space set group with DRX-RetransmissionTimer DL/UL running in group 1 or a group with dense PDCCH monitoring behavior or in all Type3-PDCCH CSS sets and/or USS sets configured in active DL BWP.

Support switching the search space set group with SR transmission on PUCCH with pending state in group 1 or a group with dense PDCCH monitoring behavior or in all Type3-PDCCH CSS sets and/or USS sets configured in active DL BWP.

Support switching the search space set group with RAR receiving or PDCCH decoding with the CRC scrambled by RA-RNTI for the Random Access Preamble not selected by MAC entity among the contention-based Random Access Preamble in group 1 or a group with dense PDCCH monitoring behavior or in all Type3-PDCCH CSS sets and/or USS sets configured in active DL BWP.

Support a PS timer to switch back to original search space set group or default search space set group.

Support a skipping duration to switch back to original search space set group or default search space set group.

Support a switching timer to switch back to original search space set group if only 2 SSSGs are supported by the UE, or PS SSSG.

Support a DRX-RetransmissionTimer DL/UL to switch back to original search space set group or PS SSSG.

Support HARQ-ACK report for the most recent DL data to switch back to a PS SSSG.

The wireless communication device 104 or 204 can switch search space set groups for different cells independently, unless the wireless communication device 104 or 204 supports jointSearchSpaceGroupSwitchingAcrossCells-r16. The wireless communication device 104 or 204 can support search space set group switching capability-1: P, unless the wireless communication device 104 or 204 supports joint-SearchSpaceGroupSwitchingAcrossCells-r16. In some implementations, P=25/25/25/25 symbols for μ=0/1/2/3.

3. pdcchSkippingwithDCI-r17: (Configured Per Band)

Indicates whether the wireless communication device 104 or 204 supports stopping monitoring PDCCH during one of the two skipping duration values with DCI 0_1 or DCI 1_1 or DCI 0_2 or DCI 1_2 monitoring that comprises of the following functional components:

Monitor DCI 0_1 or DCI 1_1 or DCI 0_2 or DCI 1_2 with a PDCCH skipping field;

Support stopping PDCCH skipping with PDCCH decoding during a skipping duration;

Support stopping PDCCH skipping with DRX-RetransmissionTimer DL/UL running;

Support stopping PDCCH skipping with SR transmission on PUCCH with pending state;

Support stopping PDCCH skipping with RAR receiving or PDCCH decoding with the CRC scrambled by RA-RNTI for the Random Access Preamble not selected by MAC entity among the contention-based Random Access Preamble;

Support a PS timer to switch back to original search space set group or default search space set group;

Support a skipping duration to switch back to original search space set group or default search space set group;

Support a switching timer to switch back to original PDCCH skipping;

Support a DRX-RetransmissionTimer DL/UL to switch back to original PDCCH skipping.

Support HARQ-ACK report for the most recent DL data to switch back to original PDCCH skipping.

The wireless communication device 104 or 204 can switch search space set groups for different cells independently, unless the wireless communication device 104 or 204 supports jointSearchSpaceGroupSwitchingAcrossCells-r16 or jointPdcchSkippingAcrossCells-r17. The wireless communication device 104 or 204 can support search space set group switching capability-1: P, unless the wireless communication device 104 or 204 can supports jointSearchSpaceGroupSwitchingAcrossCells-r16 or jointPdcchSkippingAcrossCells-r17. In some implementations, P=25/25/25/25 symbols for μ=0/1/2/3.

Note that the default search space set group is configured by a higher layer parameter, or original search space set group, or selected from the group 0, group 1 and the regular SSSG (e.g., all Type3-PDCCH CSS sets and/or USS sets configured in active DL BWP in a cell or across a group of cells bundled for SSSG switching). Also note that the original search space set group is the most recent search space set group before triggering PDCCH skipping. Also, the original PDCCH skipping is the PDCCH skipping with a most recent PDCCH skipping duration.

4. pdcchSkippingwithoutDCI-r17: (Configured Per Band)

Indicates whether the wireless communication device 104 or 204 supports PDCCH skipping without DCI 0_1 or DCI 1_1 or DCI 0_2 or DCI 1_2 monitoring (e.g., (i) implicit PDCCH decoding, DRX-RetransmissionTimer DL/UL running, (ii) SR transmission on PUCCH with pending state, (iii) RAR receiving or PDCCH decoding with the CRC scrambled by RA-RNTI for the Random Access Preamble not selected by MAC entity among the contention-based Random Access Preamble, (iv) PS timer, (v) the end of PDCCH skipping, HARQ-ACK report) that comprises of the following functional components:

Support stopping PDCCH skipping with PDCCH decoding during a skipping duration.

Support stopping PDCCH skipping with DRX-RetransmissionTimer DL/UL running.

Support stopping PDCCH skipping with SR transmission on PUCCH with pending state.

Support stopping PDCCH skipping with RAR receiving or PDCCH decoding with the CRC scrambled by RA-RNTI for the Random Access Preamble not selected by MAC entity among the contention-based Random Access Preamble.

Support a PS timer to switch back to original search space set group or default search space set group.

Support a skipping duration to switch back to original search space set group or default search space set group.

Support a switching timer to switch back to original PDCCH skipping.

Support a DRX-RetransmissionTimer DL/UL to switch back to original PDCCH skipping.

Support HARQ-ACK report for the most recent DL data to switch back to original PDCCH skipping.

The wireless communication device 104 or 204 can switch search space set groups for different cells independently, unless the wireless communication device 104 or 204 supports jointSearchSpaceGroupSwitchingAcrossCells-r16 or jointPdcchSkippingAcrossCells-r17. The wireless communication device 104 or 204 supports search space set group switching capability-1: P, unless the wireless communication device 104 or 204 supports jointSearchSpace-GroupSwitchingAcrossCells-r16 or jointPdcchSkippingAcrossCells-r17. In some implementations, P=25/25/25/25 symbols for μ=0/1/2/3.

5. pdcchSkippingcapability2-r17 (Configured Per Band)

Indicates whether the wireless communication device 104 or 204 supports PDCCH skipping Capability-2: P. If the wireless communication device 104 or 204 supports this feature, the wireless communication device 104 or 204 needs to report searchSpaceSetGroupSwitchingwithDCI-r17 or searchSpaceSetGroupSwitchingwithoutDCI-r17 or pdcchSkippingwithDCI-r17 or pdcchSkippingwithoutDCI-r17 or pdcchMonitoringAdaptationwithDCI-r17 or pdcchMonitoringAdaptationwithoutDCI-r17. In some implementations, P=10/12/22/25 symbols for μ=0/1/2/3 SCS.

Note that this capability is used for switching between search space set group switching and PDCCH skipping.

6. jointPdcchSkippingAcrossCells-r17 (Per Band Combination)

Indicates whether the wireless communication device 104 or 204 supports being configured with a group of cells and skipping PDCCH monitoring jointly over these cells. If the wireless communication device 104 or 204 supports this feature, the wireless communication device 104 or 204 needs to report pdcchSkippingwithDCI-r17 or pdcchSkippingwithoutDCI-r17 or pdcchMonitoringAdaptationwithDCI-r17 or pdcchMonitoringAdaptationwithoutDCI-r17.

Note that this capability is used for switching between search space set group switching and PDCCH skipping.

7. pdcchMonitoringAdaptationwithDCI-r17: (Configured Per Band)

Indicates whether the wireless communication device 104 or 204 supports switching among N groups of search space sets and PDCCH skipping of M different skipping duration values with DCI 0_1 or DCI 1_1 or DCI 0_2 or DCI 1_2 monitoring that comprises of the following functional components: For example, N=2 and M=2.

Monitor DCI 0_1 or DCI 1_1 or DCI 0_2 or DCI 1_2 with a PDCCH monitoring adaptation field for search space set switching or PDCCH skipping indication;

Support switching the search space set group with PDCCH decoding in non-default search space set group or a group with dense PDCCH monitoring behavior or in all Type3-PDCCH CSS sets and/or USS sets configured in active DL BWP;

Support switching the search space set group with DRX-RetransmissionTimer DL/UL running in non-default search space set group or a group with dense PDCCH monitoring behavior or in all Type3-PDCCH CSS sets and/or USS sets configured in active DL BWP;

Support switching the search space set group with SR transmission on PUCCH with pending state in non-default search space set group or a group with dense PDCCH monitoring behavior or in all Type3-PDCCH CSS sets and/or USS sets configured in active DL BWP;

Support switching the search space set group with RAR receiving or PDCCH decoding with the CRC scrambled by RA-RNTI for the Random Access Preamble not selected by MAC entity among the contention-based Random Access Preamble in non-default search space set group or a group with dense PDCCH monitoring behavior or in all Type3-PDCCH CSS sets and/or USS sets configured in active DL BWP;

Support a PS timer to switch back to default search space set group;

Support a skipping duration to switch back to default search space set group;

Support a switching timer to switch back to default search space set group;

Support a DRX-RetransmissionTimer DL/UL to switch back to original PDCCH monitoring behavior.

Support HARQ-ACK report for the most recent DL data to switch back to original PDCCH monitoring behavior.

The wireless communication device 104 or 204 can switch search space set groups for different cells independently, unless the wireless communication device 104 or 204 supports jointSearchSpaceGroupSwitchingAcrossCells-r16 or jointPdcchSkippingAcrossCells-r17. The wireless communication device 104 or 204 supports search space set group switching capability-1: P, unless the wireless communication device 104 or 204 supports jointSearchSpaceGroupSwitchingAcrossCells-r16 or jointPdcchSkippingAcrossCells-r17. In some implementations, P=25/25/25/25 symbols for μ=0/1/2/3.

Note that the default search space set group is configured by higher layer parameter, or original search space set group, or selected from the group 0, group 1 and all Type3-PDCCH CSS sets and/or USS sets configured in active DL BWP. Also, note that the original PDCCH monitoring behavior is the most recent PDCCH monitoring behavior involving group 0, group 1, PDCCH skipping with first skipping duration, PDCCH skipping with second skipping duration or all Type3 CSS sets or USS sets configured in active DL BWP.

8. pdcchMonitoringAdaptationwithoutDCI-r17: (Configured Per Band)

Indicates whether the wireless communication device 104 or 204 supports switching among N groups of search space sets and PDCCH skipping of M different skipping duration values (e.g., (i) implicit PDCCH decoding, DRX-RetransmissionTimer DL/UL running, (ii) SR transmission on PUCCH with pending state, (iii) RAR receiving or PDCCH decoding with the CRC scrambled by RA-RNTI for the Random Access Preamble not selected by MAC entity among the contention-based Random Access Preamble, (iv) PS timer, (v) the end of PDCCH skipping, HARQ-ACK report) that comprises of the following functional components: For example, N=2 and M=2.

Support switching the search space set group with PDCCH decoding in non-default search space set group or a group with dense PDCCH monitoring behavior or in all Type3-PDCCH CSS sets and/or USS sets configured in active DL BWP.

Support switching the search space set group with DRX-RetransmissionTimer DL/UL running in non-default search space set group or a group with dense PDCCH monitoring behavior or in all Type3-PDCCH CSS sets and/or USS sets configured in active DL BWP.

Support switching the search space set group with SR transmission on PUCCH with pending state in non-default search space set group or a group with dense PDCCH monitoring behavior or in all Type3-PDCCH CSS sets and/or USS sets configured in active DL BWP.

Support switching the search space set group with RAR receiving or PDCCH decoding with the CRC scrambled by RA-RNTI for the Random Access Preamble not selected by MAC entity among the contention-based Random Access Preamble in non-default search space set group or a group with dense PDCCH monitoring behavior or in all Type3-PDCCH CSS sets and/or USS sets configured in active DL BWP.

Support a PS timer to switch back to default search space set group.

Support a skipping duration to switch back to default search space set group.

Support a switching timer to switch back to default search space set group.

Support a DRX-RetransmissionTimer DL/UL to switch back to original PDCCH monitoring behavior.

Support HARQ-ACK report for the most recent DL data to switch back to original PDCCH monitoring behavior triggered by DCI.

The wireless communication device 104 or 204 can switch search space set groups for different cells independently, unless the wireless communication device 104 or 204 supports jointSearchSpaceGroupSwitchingAcrossCells-r16 or jointPdcchSkippingAcrossCells-r17. The wireless communication device 104 or 204 supports search space set group switching capability-1: P, unless the wireless communication device 104 or 204 supports jointSearchSpaceGroupSwitchingAcrossCells-r16 or jointPdcchSkippingAcrossCells-r17. In some implementations, P can be an integer that is equal to 10/12/22/25 symbols for $\mu=0/1/2/3$ SCS.

9. dataProcessingforpdcchSkipping-r17 (Configured Per Band)

Indicates whether the wireless communication device 104 or 204 supports monitoring PDCCH scheduling retransmission data, or PDCCH scheduling a PUSCH corresponding to a scheduling request (SR) on a physical uplink control channel (PUCCH) with pending state, or PDCCH monitoring after the wireless communication device receives a random access response (RAR) successfully for a random access preamble that is not selected by a medium access control (MAC) entity among contention-based random access preambles, or PDCCH during an Active Time which is activated by events except for running of drx-onDurationTimer or drx-InactivityTimer, or PDCCH monitoring after the wireless communication device monitors a search space set provided by recoverySearchSpaceId when the wireless communication device is performing or before start performing PDCCH skipping or is performing or before start performing a sparse SSSG monitoring. In some implementations, if the wireless communication device 104 or 204 supports this feature, the wireless communication device 104 or 204 needs to report pdcchSkippingwithDCI-r17 or pdcchSkippingwithoutDCI-r17.

In some implementations, the wireless communication device 104 or 204 ignores PDCCH skipping when the UE meets at least one of the above events.

In some implementations, the wireless communication device 104 or 204 applies PDCCH skipping after all data received successfully.

10. dataProcessingforsearchSpaceSetGroupSwitching-r17 (Configured Per Band)

Indicates whether the wireless communication device 104 or 204 supports monitoring PDCCH scheduling retransmission data and applying search space set group switching after all data received successfully. If the wireless communication device 104 or 204 supports this feature, the wireless communication device 104 or 204 needs to report searchSpaceSwitchingwithDCI-r17 or searchSpaceSwitchingwithoutDCI-r17.

11. psSearchSpaceGroupMornitoring-r17 (Configured Per Band)

Indicates whether the wireless communication device 104 or 204 supports monitoring PDCCH according to a power saving search space set group.

In some implementations, the power saving search space set group can involve no PDCCH monitoring occasions for PDCCH carrying DCI scrambled with RNTIs belonging to Type-3 CSS sets or USS sets. In some implementations, the power saving search space set group can be associated with a PS timer and when the PS timer is running the wireless communication device 104 or 204 does not monitor PDCCH carrying DCI scrambled with RNTIs belonging to Type-3 CSS sets or USS sets according to the PS SSSG. In some implementations, the power saving search space set group can be the group with restrictions on the parameters of PDCCH monitoring including at least one of 1) the bitmap of monitoring symbols within a slot is all zeros, 2) the duration $T_s$ is 0 slot, 3) the PDCCH monitoring periodicity $k_s$ is NULL, 4) the PDCCH monitoring periodicity $k_s$ is invalid, 5) the PDCCH monitoring offset $O_s$ is equal to $(k_s-1)$ slots, and/or 6) the PDCCH monitoring occasion(s) is equal to 0.

12. SearchSpaceGroup-r17 (Configured Per Band)

Indicates whether the wireless communication device 104 or 204 supports search space set group switching between two groups of search space sets or three groups of search space sets.

13. pdcchMonitoringSwitchingCapability-r17 (Configured for Frequency Band 2)

Indicates whether the wireless communication device 104 or 204 supports the minimum delay for SSSG switching or PDCCH skipping as 25 symbols for $\mu=3$.

Herein, the P corresponding to search space set group switching capability-1 or search space set group switching capability-2 or PDCCH skipping capability-1 or PDCCH skipping capability-2, and indicates the minimum delay between SSSG switching or PDCCH skipping.

Embodiment 4: Triggering Events for SSSG Switching and/or PDCCH Skipping

The plurality of triggering events can be related to a plurality of control information. The plurality of control information can include at least one of 1) the DCI indication information, 2) a switching timer for SSSG switching, 3) a PS timer for PS SSSG, 4) PDCCH decoding in a sparser SSSG, 5) SR transmission on PUCCH with a pending state, 6) RAR receiving for the random access preamble not selected by MAC entity among the contention-based random access preamble, and/or 7) PDCCH monitoring adaptation pattern including SSSG switching and PDCCH skipping configured by RRC signaling.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used therein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The various embodiments described above and in the claims can be implemented as computer code instructions that are executed by one or more processors of the wireless communication device (or UE) 104 04 204 or the wireless communication node 102 or 202. A computer-readable medium may store the computer code instructions.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

The invention claimed is:

1. A method of comprising:

reporting, by a wireless communication device to a wireless communication node, a plurality of capabilities of the wireless communication device;

receiving, by the wireless communication device from the wireless communication node, control information;

performing, by the wireless communication device, physical downlink control channel (PDCCH) monitoring using a group of search space sets (SSSs) selected from a plurality of search space set groups (SSSGs) according to the control information, wherein the number of SSSG is N, and N is an integer that is not smaller than 1, or wherein each of the SSSGs includes a number of SSSs that is up to at most a maximum number of SSSs configured in a bandwidth part (BWP), wherein the SSSGs are classified according to a search space type including at least one of a type-3 common search space (CSS) type or user equipment specific search space (USS) type, wherein the control information includes indication information of downlink control information and a radio resource control (RRC) signaling parameter configuration related to a SSSG switching or a PDCCH skipping; and performing, by the wireless communication device where the RRC signaling parameter configuration relates to the PDCCH skipping, the PDCCH skipping according to a skipping duration, wherein a value of the skipping duration is determined from among M PDCCH skipping duration values in a list of candidate skipping duration values configured via higher layer signaling, wherein M is an integer value greater than or equal to 1.

2. The method of claim 1, comprising:

performing, by the wireless communication device, the PDCCH skipping according to the skipping duration, responsive to at least one triggering event associated with the control information.

3. The method of claim 2, wherein the SSSG switching between the SSSGs or the PDCCH skipping, is triggered via an indication in downlink control information (DCI).

4. The method of claim 1, wherein a leading bit or most significant bit (MSB) of a field for indicating the SSSG switching or the PDCCH skipping, is used to indicate at least one of:

to enable or disable the PDCCH monitoring according to a SSSG, or the SSSG switching; or to enable or disable the PDCCH skipping according to a skipping duration.

5. The method of claim 1, wherein one or more remaining bits or non-MSB of a field for indicating the SSSG switching or the PDCCH skipping, is used to indicate at least one of:

an SSSG identifier (ID) of a SSSG to which the wireless communication device shall switch, to perform the PDCCH monitoring, wherein the SSSG ID is determined according to a current monitored SSSG or a value of a bit field indicating that the wireless communication device shall perform the SSSG switching to monitor PDCCH; or a value of a skipping duration.

6. A wireless communication device, comprising:

at least one processor configured to:

report, via a transceiver to a wireless communication node, a plurality of capabilities of the wireless communication device;

receive, via the transceiver from the wireless communication node, control information;

perform physical downlink control channel (PDCCH) monitoring using a group of search space sets (SSSs) selected from a plurality of search space set groups (SSSGs) according to the control information, wherein the number of SSSG is N, and N is an integer that is not smaller than 1, or wherein each of the SSSGs includes a number of SSSs that is up to at most a maximum number of SSSs configured in a bandwidth part (BWP), wherein the SSSGs are classified according to a search space type including at least one of a type-3 common search space (CSS) type or user equipment specific search space (USS) type, wherein the control information includes indication information of downlink control information and a radio resource control (RRC) signaling parameter configuration related to a SSSG switching or a PDCCH skipping; and perform the PDCCH skipping according to a skipping duration where the RRC signaling parameter configuration relates to the PDCCH skipping, wherein a value of the skipping duration is determined from among M PDCCH skipping duration values in a list of candidate skipping duration values configured via higher layer signaling, wherein M is an integer value greater than or equal to 1.

7. A method comprising:

receiving, by a wireless communication node from a wireless communication device, a plurality of capabilities of the wireless communication device;

sending, by the wireless communication node to the wireless communication device, control information, wherein the wireless communication device is configured to perform physical downlink control channel (PDCCH) monitoring using a group of search space sets (SSSs) selected from a plurality of search space set groups (SSSGs) according to the control information, and wherein the number of SSSG is N, and N is an integer that is not smaller than 1, or wherein each of the SSSGs includes a number of SSSs that is up to at most a maximum number of SSSs configured in a bandwidth part (BWP), wherein the SSSGs are classified according to a search space type including at least one of a type-3 common search space (CSS) type or user equipment specific search space (USS) type, wherein the control information includes indication information of downlink control information and a radio resource control (RRC) signaling parameter configuration related to a SSSG switching or a PDCCH skipping, and wherein the wireless communication device is further configured to perform the PDCCH skipping according to a skipping duration where the RRC signaling parameter configuration relates to the PD|CCH skipping, wherein a value of the skipping duration is determined from among M PDCCH skipping duration values in a list of candidate skipping duration values configured via higher layer signaling, wherein M is an integer value greater than or equal to 1.

8. A wireless communication node, comprising:

at least one processor configured to:

receive, via a transceiver from a wireless communication device, a plurality of capabilities of the wireless communication device;

send, via the transceiver to the wireless communication device, control information, wherein the wireless communication device is configured to perform physical downlink control channel (PDCCH) monitoring using a group of search space sets (SSSs) selected from a plurality of search space set groups (SSSGs) according to the control information, and wherein the number of SSSG is N, and N is an integer that is not smaller than 1, or wherein each of the SSSGs includes a number of SSSs that is up to at most a maximum number of SSSs configured in a bandwidth part (BWP), wherein the SSSGs are classified according to a search space type including at least one of a type-3 common search space (CSS) type or user equipment specific search space (USS) type, wherein the control information includes indication information of downlink control information and a radio resource control (RRC) signaling parameter configuration related to a SSSG switching or a PDCCH skipping, and wherein the wireless communication device is further configured to perform the PDCCH skipping according to a skipping duration where the RRC signaling parameter configuration relates to the PD|CCH skipping, wherein a value of the skipping duration is determined from among M PDCCH skipping duration values in a list of candidate skipping duration values configured via higher layer signaling, wherein Mis an integer value greater than or equal to 1.

9. The method of claim 1, wherein the control information includes at least one of indication information of downlink control information (DCI) or a radio resource control (RRC) signaling parameter configuration related to the SSSG switching or PDCCH skipping.

10. The wireless communication device of claim 6, wherein the at least one processor is configured to:

perform the PDCCH skipping according to the skipping duration, responsive to at least one triggering event associated with the control information.

11. The wireless communication device of claim 6, wherein the control information includes at least one of indication information of downlink control information (DCI) or a radio resource control (RRC) signaling parameter configuration related to the SSSG switching or PDCCH skipping.

12. The wireless communication device of claim 6, wherein the SSSG switching between the SSSGs or the PDCCH skipping, is triggered via an indication in downlink control information (DCI).

13. The wireless communication device of claim 6, wherein a leading bit or most significant bit (MSB) of a field for indicating the SSSG switching or the PDCCH skipping, is used to indicate at least one of:

to enable or disable the PDCCH monitoring according to a SSSG, or the SSSG switching; or to enable or disable the PDCCH skipping according to a skipping duration.

14. The wireless communication device of claim 6, wherein one or more remaining bits or non-MSB of a field for indicating the SSSG switching or the PDCCH skipping, is used to indicate at least one of:

an SSSG identifier (ID) of a SSSG to which the wireless communication device shall switch, to perform the PDCCH monitoring, wherein the SSSG ID is determined according to a current monitored SSSG or a value of a bit field indicating that the wireless communication device shall perform the SSSG switching to monitor PDCCH; or a value of a skipping duration.

15. The method of claim 7, wherein the control information includes at least one of indication information of downlink control information (DCI) or a radio resource control (RRC) signaling parameter configuration related to the SSSG switching or PDCCH skipping.

16. The wireless communication node of claim 8, wherein the control information includes at least one of indication information of downlink control information (DCI) or a radio resource control (RRC) signaling parameter configuration related to the SSSG switching or PDCCH skipping.

17. The method of claim 1, wherein the list of candidate skipping duration values comprises a subset of values of PDCCH monitoring periodicity (ks) in SearchSpace information element (IE).

18. The method of claim 1, wherein the plurality of capabilities of the wireless communication device includes at least one of:

searchSpaceSetGroupSwitchingwithDCI-r17, which indicates whether the wireless communication device supports switching among a plurality of groups of SSSs with DCI 0_1 or DCI 1_1 or DCI 0_2 or DCI 1_2 monitoring;

pdcchSkippingwithDCI-r17, which indicates whether the wireless communication device supports stopping PDCCH monitoring or PDCCH skipping with DCI 0_1 or DCI 1_1 or DCI 0_2 or DCI 1_2 monitoring;

pdcchSkippingcapability2-r17, which indicates whether the wireless communication device supports a minimum delay (P) for switching among the SSSGs, where P=10/22/25 symbols for a subcarrier spacing configuration numerology of $\mu$=0/1/2/3, and if the wireless communication device supports the minimum delay, the wireless communication device is to report to the wireless communication node one of searchSpaceSetGroupSwitchingwithDCI-r17 or pdcchMonitoringAdaptationwithDCI-r17; or pdcchMonitoringAdaptationwithDCI-r17, which indicates whether the wireless communication device supports switching among a plurality of groups of SSSs and PDCCH skipping of a plurality of different skipping duration values with DCI 0_1 or DCI 1_1 or DCI 0_2 or DCI 1_2 monitoring.

19. The method of claim 1, wherein a minimum delay for the SSSG switching among the SSSGs for $\mu$=3 is 40 symbols.

* * * * *